United States Patent [19]

Haberman et al.

[11] Patent Number: 5,613,204
[45] Date of Patent: Mar. 18, 1997

[54] BEACON SYSTEM FOR ROAMING CELLULAR STATIONS

[75] Inventors: Michael Haberman, Morris Plains; Robert T. Braun, Pittstown, both of N.J.; James F. McHenry, Doylestown, Pa.

[73] Assignee: Bell Atlantic Mobile Systems, Inc., Bedminster, N.J.

[21] Appl. No.: 362,307

[22] Filed: Dec. 22, 1994

[51] Int. Cl.$^6$ .................. H04Q 7/22; H04B 7/26
[52] U.S. Cl. .................. 455/33.2; 455/34.1; 455/54.1; 379/60
[58] Field of Search .................. 455/54.1, 56.1, 455/34.1, 34.2, 53.1, 57.1, 33.1, 33.2; 379/59, 60, 63

[56] References Cited

U.S. PATENT DOCUMENTS

| | | |
|---|---|---|
| 4,166,927 | 9/1979 | Hamaoki . |
| 4,475,010 | 10/1984 | Huensch et al. . |
| 4,513,415 | 4/1985 | Martinez . |
| 4,718,081 | 1/1988 | Brenig . |
| 4,754,453 | 6/1988 | Eizenhofer . |
| 4,850,033 | 7/1989 | Eizenhofer et al. . |
| 4,903,320 | 2/1990 | Hanawa . |
| 4,916,728 | 4/1990 | Blair . |
| 5,101,500 | 3/1992 | Marui . |
| 5,101,501 | 3/1992 | Gilhousen et al. . |
| 5,111,535 | 5/1992 | Tokunaga . |
| 5,127,100 | 6/1992 | D'Amico et al. . |
| 5,150,362 | 9/1992 | Akerberg . |
| 5,159,625 | 10/1992 | Zicker . |
| 5,193,109 | 3/1993 | Chien-Yeh Lee . |
| 5,212,809 | 5/1993 | Oka .......................... 455/54.1 |
| 5,212,822 | 5/1993 | Fukumine et al. . |
| 5,239,675 | 8/1993 | Dudczak . |
| 5,243,598 | 9/1993 | Lee . |
| 5,261,117 | 11/1993 | Olson . |
| 5,289,527 | 2/1994 | Tiedemann, Jr. . |
| 5,291,544 | 3/1994 | Hecker . |
| 5,295,180 | 3/1994 | Vendetti et al. . |
| 5,301,359 | 4/1994 | Van Den Heuvel et al. ......... 455/54.1 |
| 5,303,289 | 4/1994 | Quinn . |
| 5,319,795 | 6/1994 | Hamabe et al. . |
| 5,327,575 | 7/1994 | Menich et al. . |
| 5,353,332 | 10/1994 | Raith et al. . |
| 5,442,680 | 8/1995 | Schellinger et al. ............... 455/33.1 |
| 5,442,806 | 8/1995 | Barber et al. ..................... 455/33.1 |

*Primary Examiner*—Chi H. Pham
*Attorney, Agent, or Firm*—Lowe, Price, LeBlanc & Becker

[57] ABSTRACT

A cellular telephone system is upgraded by modifying subscriber units for selective service provider acquisition during roaming. Priority of acquisition is given to those service providers associated with the home service provider. These preferred service providers are identified by System Identification (SIDs) numbers. A roaming subscriber unit will tune to a single broadcast frequency to identify available system providers operating in a physical area to which the subscriber has roamed.

15 Claims, 8 Drawing Sheets

BEACON SYSTEM FOR ROAMING CELLULAR STATIONS

TECHNICAL FIELD

The present invention relates generally to subscriber cellular mobile radiotelephones (CMRs). More specifically, the present invention is related to a system for automatically downloading control data to roaming CMRs.

BACKGROUND ART

Conventional cellular mobile radiotelephone subscriber units (CMRs) are capable of communicating on at least one of two independent sets of frequencies. However, a conventional cellular base system communicates on only one of these two sets of frequencies. Thus, a cellular base system may be referred to as an "A" system if it uses one set of frequencies or a "B" system if it uses the other set of frequencies. This dual-system approach to radiotelephony results from regulations which are intended, at least in part, to promote competition in providing radiotelephone services. When A and B cellular systems are both located in a single geographic area, radiotelephone service customers may choose to subscribe to either the A or B system in accordance with which system provides the best value to the customer. B systems are often referred to as "wireline" carriers because B systems are typically operated by the companies that provide wireline telecommunication services where the B systems are located. A systems are often referred to as non-wireline carriers because they are operated by companies other than the companies that operate the competing B systems. These frequency allocations are not necessarily permanent.

Each frequency set in a given cellular service area is assigned to one and only one service company. However, in different service areas the same frequency set may be assigned to different service companies (much as a television channel may be assigned to an affiliate of one network in one city and to an affiliate of another network in another city).

The home frequency set of a given telephone unit is the set of frequencies which the unit will ordinarily attempt to use. It will depend in large part on which service company is subscribed to by the telephone unit's user: if the user is a subscriber of a nonwireline service company, the user's home frequency set will be the A frequencies, and vice versa.

As will be familiar to those of ordinary skill, a frequency set typically includes paging channels and associated signalling channels, as well as voice channels. The paging and signalling channels are used for preliminary coded communications between a cellular telephone and a cell site in setting up a telephone call, after which a voice channel is assigned for the telephone's use on that call.

Each service company broadcasts a unique System Identification Number (SID) on all paging channels of the frequency sets on which it provides service in a given service area. A suitably equipped cellular telephone can thus determine which service company is providing service on a given paging channel by identifying the SID. Usually the SID contains three digits.

Receipt of a home SID is not necessarily required to be able to place a call. Many service companies have reciprocal billing arrangements with one another, meaning that a call can be placed on a frequency associated with a non-home cellular system. However, use of a non-home service company in this manner to place a call may result in the imposition of a surcharge (e.g., a fixed surcharge or a higher per-unit rate).

Furthermore, if the non-home service company does not have a reciprocal billing arrangement with the user's home service company, as a practical matter the user may not be able to place a call at all. Even though the telephone unit is capable of establishing a connection via the carrier signal, the non-home service company's switching equipment typically will not allow the user to do anything with the connection without a way to bill the user for his or her usage. Some service companies automatically switch calls of this kind to an operator who can take down a credit card number. However, absent a billing arrangement of some kind, no call can be completed.

Cellular telephones typically include status indication displays such as status lights. The "roam" light indicates that the telephone has detected a non-home SID on a carrier signal and can make at least a connection with that company's service via the carrier signal. The "no-service" light indicates that no cellular connections are available.

When a customer subscribes to a cellular system (either an A or B system), that system becomes the subscriber/customer's home system. The company that operates a customer's home system collects billing information and bills the customer for the customer's use of the home system's radiotelephone services. Whenever a customer is operating his or her CMR on a system other than the customer's home system, the customer is engaging in an activity known as roaming. The cellular system upon which a roaming CMR is operating is viewed as a foreign system.

Customers may receive telecommunication services while roaming. However, the home system company and the foreign system company must cooperate with one another before roaming services are permitted. For example, the foreign system must transfer call record information to the home system, and the home system must bill for, collect funds for, and distribute funds back to the foreign system for the roaming telecommunication services. Accordingly, the customer must typically pay additional charges when the customer uses roaming services.

When the customer operates his or her CMR in the area covered by the CMR's home system, no serious cellular base system selection choice needs to be made. The customer will almost always want to use the home system because the charges for home-system telecommunication services will be less. On the other hand, when the customer is roaming away from the home system, a choice of whether to operate a CMR on an A or B foreign system must be made.

Conventional CMRs employ any one of several different programmable selection processes in choosing a cellular system upon which to operate. For example, a CMR may prefer an A system but accept a B system if an A system is not available. This is called an A/B selection process. Conversely, a CMR may prefer a B system but accept an A system if a B system is not available. This is called a B/A selection process. Alternatively, a CMR may select only A systems (A-Only) or only B systems (B-Only) regardless of whether a competing system is available. Furthermore, a CMR may select only the home system so that roaming is prohibited. Other selection processes may be implemented as well. A CMR will typically utilize a default selection process which is consistent with its home system. For example, if a CMR's home system is an A system, then the CMR will typically utilize the A-Only or A/B selection processes as a default selection process.

Conventional CMRs permit alteration of the default selection process. However, this feature is not often used by customers because it is difficult to accomplish through a CMR's handset and because an intelligent nondefault selection process setting requires an understanding of cellular radiotelephony that many customers do not possess. Accordingly, providers of cellular services recognize that, for the most part, customers do not alter the default process selection setting.

The default selection process setting tends to limit any benefits that competition between A and B systems may provide while roaming. While the default setting favors the home system, at the same time it favors approximately one half of the numerous potential foreign systems over the other half of potential foreign systems. Assuming that this default setting does not change, in providing radiotelephone services to roaming customers one of each foreign area's two competing cellular systems benefits from an equipment-caused bias. As a result, the favored foreign systems need not aggressively price roaming services, and they need not be exceptionally cooperative with a roamer's home system, because it is highly probable that a roamer will use the favored foreign system regardless of cost. Consequently, roaming costs to a customer remain undesirably high.

While conventional CMRs can be configured so that the default system selection process setting is easily alterable, such configurations do not solve the problems faced by roaming customers. A typical customer is not prepared to make, or interested in making, a purchasing decision with respect to telecommunication services every time he or she is roaming. While roaming, a customer is unlikely to know the rates charged by the competing foreign cellular systems. Moreover, the rate structures may be complicated, and they may change from time to time. Thus, when a customer is roaming, he or she typically does not possess sufficient information upon which to base an intelligent foreign cellular system selection decision, even if the CMR has the capacity for such a selection. Typically the subscriber does not desire to go to the time and trouble to obtain this information, and mark the necessary alterations in the operation of the CMR.

DISCLOSURE OF THE INVENTION

An object of the present invention is to operate a CMR to select the most desirable foreign service provider with which to communicate.

Another object of the present invention is to prioritize cellular service providers with which the home service provider of a cellular subscriber as business arrangements.

It is a further object of the present invention to "weigh" operating parameters in the selection foreign cellular service providers having contractual relationships with the home service provider roaming cellular subscriber.

It is yet a further object of the present invention to enhance competition in connection with telecommunication services provided to roaming cellular subscriber.

It is an additional object of the present invention to automatically update control data, available service provider data and calling feature data to subscriber unit CMRs.

It is yet another object of the present invention to automatically update data in mobile subscriber units that is transparent to the user of the subscriber unit, and in no way hinders the normal operation of the mobile subscriber unit.

Yet a further object of the present invention is to automatically download up to date control data to roaming radio telephone subscriber unit CMRs.

Still a further object of the present invention is to download radio telephone control data from a central point over a range covering the geographic areas of a plurality of service providers.

This and other objects of the present invention are carried out by a control system having means for broadcasting a SID and an associated control frequency to a plurality of radio telephone subscriber units, A SID for each service provider operating within range of the means for broadcasting is included in the broadcast, A control system also includes means in the radio telephone subscriber units for automatically tuning to a frequency on which the means for broadcasting operates when the radio telephone subscriber unit is in a roaming state. Each of the radio telephone subscriber units includes means for carrying out a communication operation in response with receipt of the SID list for the means for broadcasting.

A second embodiment of the present invention is directed to a radio telephone subscriber unit. The unit includes means for automatically tuning to a first predetermined frequency when a roaming state is detected. The subscriber unit also includes means for responding to the receipt of a system identification number corresponding to the home service provider of the subscriber unit while it is in the roaming state. The subscriber unit further includes means for carrying out a communication operation responsive to the receipt of the home service provider SID.

BEST MODE FOR CARRYING OUT THE INVENTION

Figure 1:
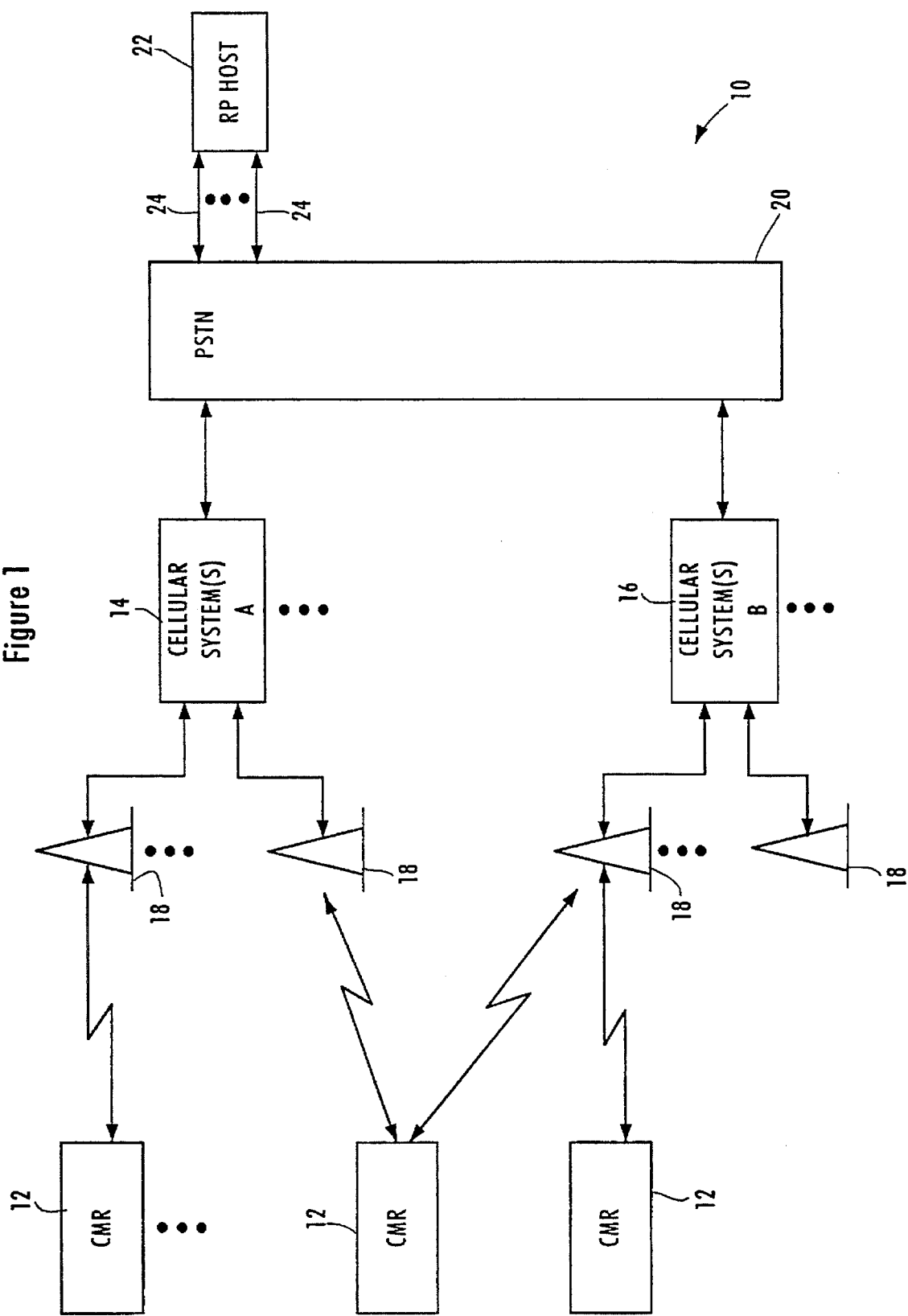
FIG. 1 is a block diagram of a cellular radiotelephone system constructed in accordance with the present invention.

FIG. 1 shows a block diagram of a cellular radiotelephone system 10 within which the method of the present invention is practiced. System 10 includes a multiplicity of cellular mobile radiotelephone subscriber unit (CMRs) 12. The precise number of CMRs 12 is not a critical feature and may range from a few to many tens of thousands. As is conventional, each of CMRs 12 is capable of communicating with either an "A" type cellular system 14 or a "B" type cellular system 16. Those skilled in the art understand that A cellular systems communicate over a first set of predetermined frequencies while B cellular systems communicate over a second set of predetermined frequencies, the first and second sets being selected so that interference between the two sets is avoided.

Cellular systems 14 and 16 each include several spaced apart cells defined by antennas 18. Communication coverage over a geographic area is achieved through frequency channel manipulation between the cells. Moreover, both an A system 14 and a B system 16 may reside in a single geographic area. When a CMR 12 has subscribed to service at one of systems 14 and 16 in a single geographic area, that system is a home system for the CMR 12. The other of systems 14 and 16 in the home geographic area, and systems 14 and 16 located in all other geographic areas are foreign systems to the CMR 12. As is conventional, when CMR 12 is operating on a foreign system 14–16, CMR 12 is roaming.

All of A systems 14 and B systems 16, regardless of their designation as a home or foreign system, couple to and operate as an integral part of the public switched telecommunications network (PSTN) 20. PSTN 20 includes all the conventional cellular radio systems, cellular switching systems, trunks, satellites, and land-wired switching systems which are well known to those skilled in this art.

System 10 also includes a remote programming (RP) host 22, which couples to PSTN 20 through at least one, but preferably many, subscriber loops 24. RP host 22 is a computer system that remotely controls the programming of CMRs 12. Generally speaking, RP host 22 periodically engages in data communication sessions with CMRs 12. During such sessions RP host 22 and a CMR 12 exchange data. Thus, data tables, timing data, predetermined telephone numbers, modes of operation flags, virtually any item of application data, and executable machine code utilized within CMR 12 may be altered as a result of such sessions.

Figure 2:
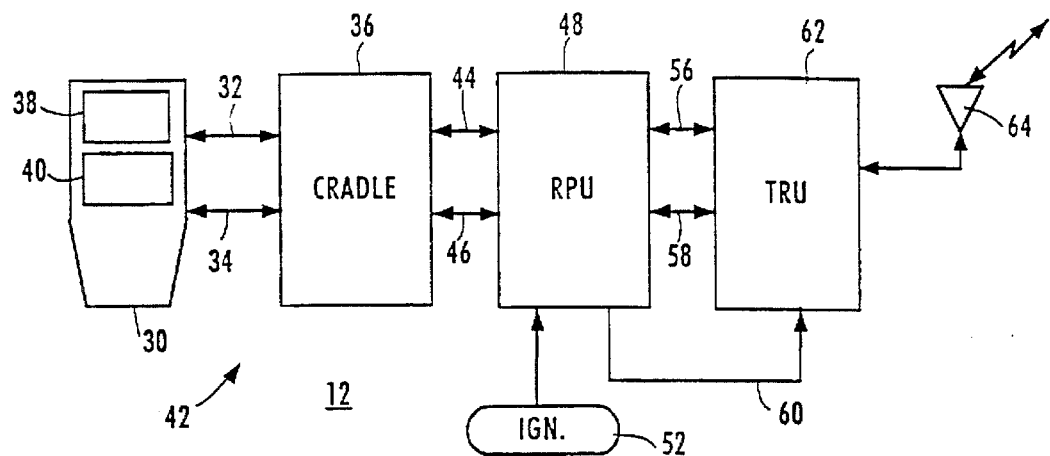
FIG. 2 is a block diagram of a cellular mobile radiotelephone (CMR) used in connection with the system of the present invention.

FIG. 2 is a block diagram of one example of a subscriber unit CMR 12 that can be used in connection with system 10. CMR 12 includes a handset 30 which is coupled through a first serial data bus 32 and a first audio bus 34 to a cradle 36. Handset 30 includes a display 38 and an array of keys 40. Together, handset 30 and cradle 36 are referred to as a control unit (CU) 42. CU 42 is a conventional control unit that performs functions which are well known in the art of cellular telephony.

A second serial data bus 44 and a second audio bus 46 interconnect cradle 36 with a remote programmable unit (RPU) 48. In addition, an ignition input 52 to RPU 48 couples to the ignition of an automobile (not shown) in which CMR 12 is installed. RPU 48 regenerates serial and audio busses 44 and 46 as serial data and audio busses 56 and 58, respectively. In addition, RPU 48 has a simulated ignition output 60. Busses 56 and 58, and output 60 couple to a conventional transmit-receive unit (TRU) 62. As is conventional, an antenna 64 through which TRU 62 communicates with antennae 18 (see FIG. 1) also couples to TRU 62. RPU 48 may represent a kit which is installed between a conventional CU 42 and a conventional TRU 62 of a conventional CMR. The use of conventional CMR equipment as a platform to which remote programmability hardware is added reduces costs due to the mass production of such conventional equipment. Preferably, RPU 48 is physically mounted on CU 42.

Figure 3:
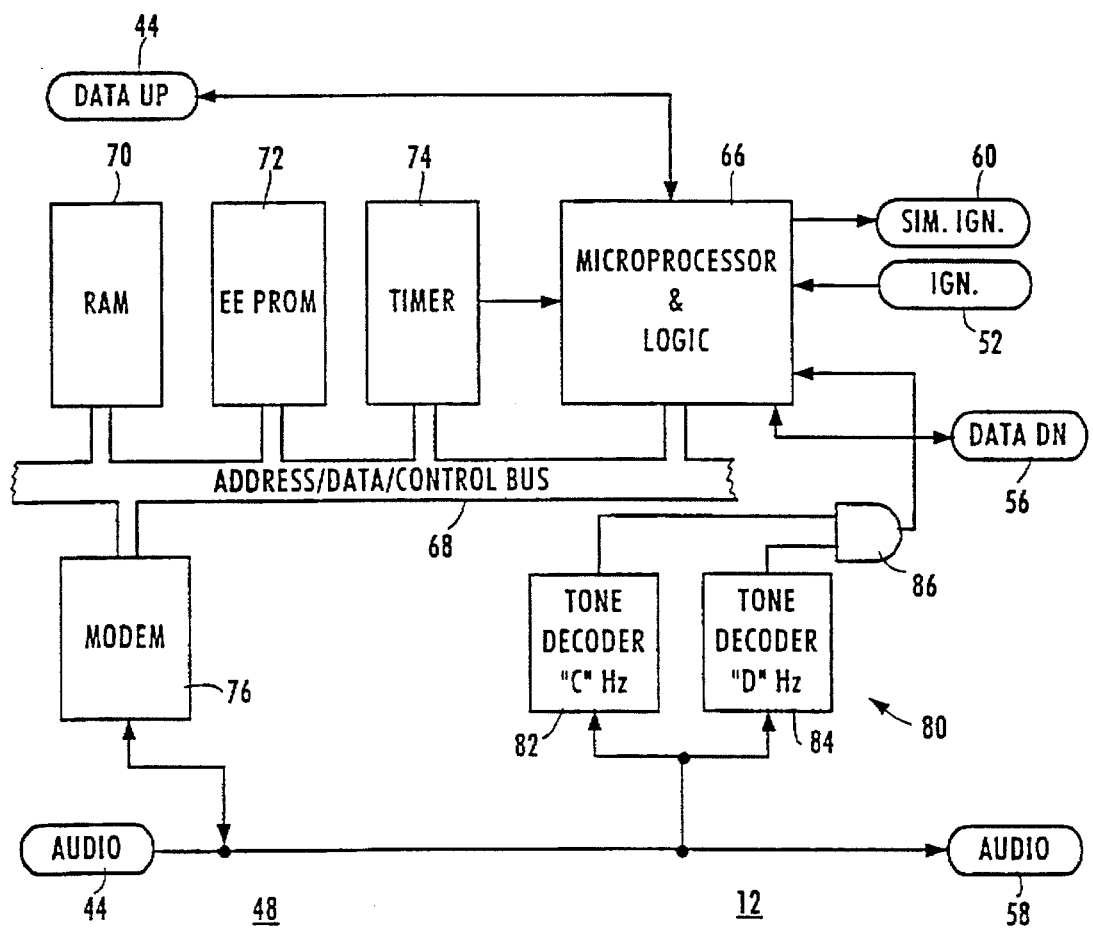
FIG. 3 is a block diagram of a remotely programmable unit (RPU) portion of the CMR of the present invention.

FIG. 3 is a block diagram of typical hardware included in an RPU 48 such as that depicted in FIG. 2. As shown in FIG. 3, a microprocessor and logic section 66 is coupled to serial data bus 44 and to an internal address/data/control bus 68. Through bus 68, section 66 communicates with a random access memory (RAM) 70, a non-volatile, read-write memory 72, such as an electrically erasable PROM (EEPROM), a timer 74, and a data port of a modem 76. Those skilled in the art will understand that RAM 70 is one example of a volatile read-write type of memory, and battery-backed-up RAM and other memory devices may serve as non-volatile read-write memory 72. An audio port of modem 76 is additionally coupled to audio bus 58, and timer 74 preferably is coupled to an interrupt input of section 66.

Microprocessor and logic section 66 generally control the operation of RPU 48. In conjunction with timer 74, section 66 maintains a clock and calendar. Moreover, power is continually supplied to section 66, timer 74, and supporting sections of RPU 48 so that data describing the date and time remain current even when ignition to a vehicle in which CMR 12 is installed is "off".

Modem 76 is a conventional modem circuit. Consequently, modem 76 recognizes audio signals on audio bus 58. Likewise, modem 76 supplies audio signals to audio bus 58. Modem 76 preferably operates at conventional data rates, such as 300, 1200, or 2400 bits per second, depending on control data supplied by microprocessor section 66. Communicated data and control data, such as carrier detection, are communicated to and from microprocessor section 66 through bus 68. On the other hand, ring detection is carried out by microprocessor section 66 monitoring data commands on serial data bus 56.

Section 66 senses the state of ignition signal 52. In addition, section 66 senses the state of an output from a signal detection circuit 80. Signal detection circuit 80 includes first and second tone decoders 82 and 84, respectively. Inputs of tone decoders 82 and 84 are coupled to audio bus 58, and outputs of tone decoders 82 and 84 are coupled to inputs of a logic element 86, which performs a logical AND function. The output of element 86 serves as the output of signal detection circuit 80 and is coupled to a sensing input of section 66.

Signal detection circuit 80 is configured to detect a predetermined login audio tone. In the preferred embodiment, this login tone includes two predetermined frequencies, labeled as "C" and "D" in FIG. 3. Frequencies C and D are selected so that the login tone is as unique as possible within normal telecommunication. In other words, the login tone is unlikely to be present during normal telecommunication operations, other than in a login procedure.

The method of the present invention is practiced, at least in part, by RPU 48. As discussed above, CU 42 and TRU 62 (see FIG. 2) are provided by conventional nonremotely programmable cellular radiotelephone equipment. Specifically, in the preferred embodiment, a cellular telephone manufactured by the OKI corporation as model EM-23 serves as CU 42 and TRU 62. Generally speaking, microprocessor and logic section 66 of RPU 48 practices this method by executing programming instructions stored in memories 70–72. This method involves, at least in part, the processing of data to control the operation of system 10 (see FIG. 1). Some of the specific processing tasks performed by the preferred embodiment are directly related to the data messages and data formats dictated by the above-mentioned OKI model EM-23 cellular telephone. However, other conventional cellular telephones have similar or identical types of data messages and can be adapted by those skilled in the art for use in connection with the present invention.

Another illustrative example of a microprocessor-based telephone system operated in accordance with the present invention is described below. This examples uses an automobile cellular phone as an example, but it will be understood by those of ordinary skill that the invention can be implemented in virtually any telecommunications system.

Figure 4:
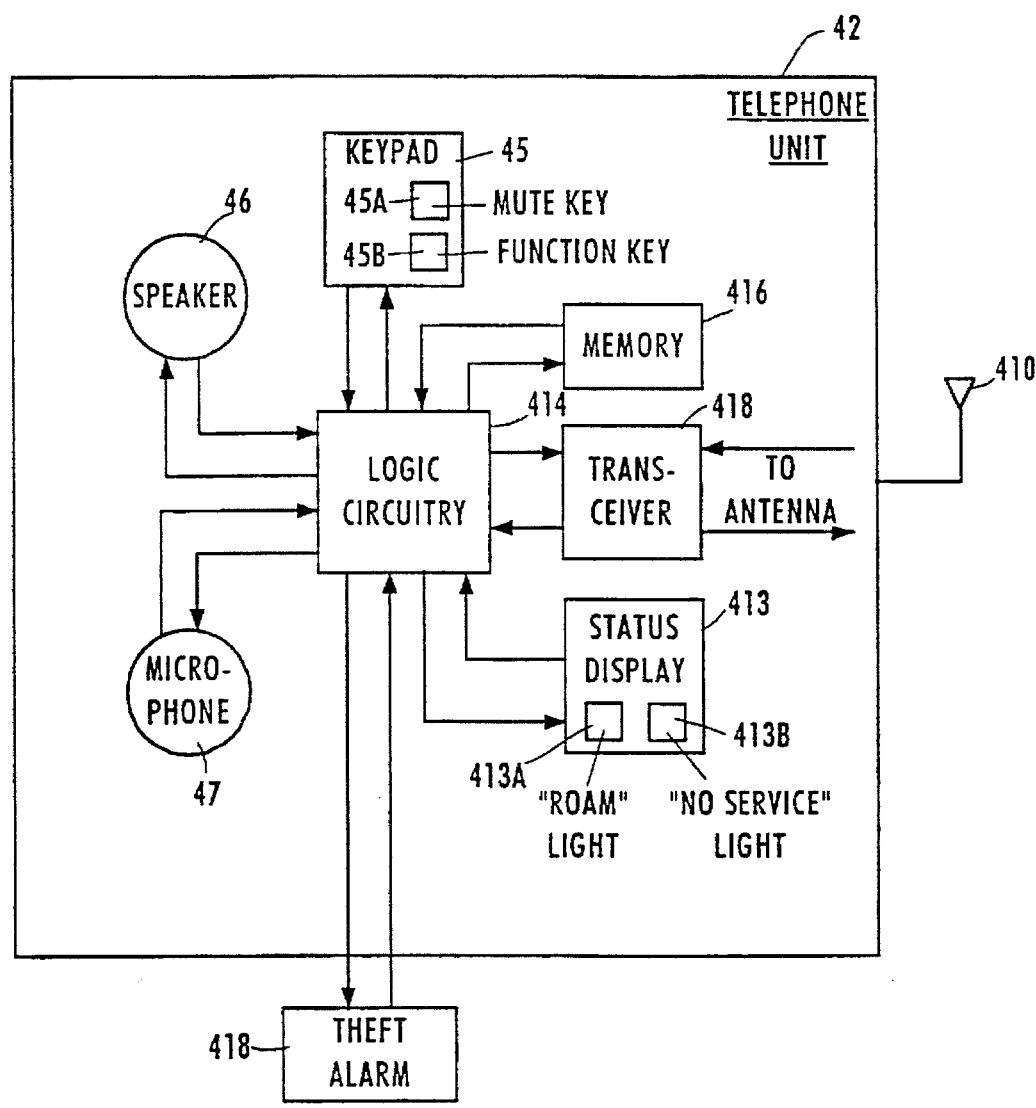
FIG. 4 depicts an alternative subscriber handset.

FIG. 4 depicts a typical automobile cellular telephone unit 42 having a unique mobile identification number (MID) stored in a suitable location such as an electrically erasable programmable read-only memory (EEPROM, not shown). Telephone units of this kind are well known in the art and are described here only in sufficient detail to aid understanding the invention.

The telephone unit 42 may constitute a handset having a keypad 45; equivalently, the keypad 45 could be located separately from the handset. Also included in the telephone unit 42 are a speaker 46 and a microphone 47, shown as being mounted within the telephone unit or handset but either or both of which could equivalently be mounted apart from the handset, either separately (e.g., in a telephone operator's headset or in wall mountings), or approximately together (e.g., in a walkie-talkie or speakerphone configuration).

A transceiver 48, ordinarily built into the telephone unit 42, exchanges signals via an antenna 410) with a Mobile Telecommunications Switching Office (MTSO) typically via radiotelephone signals relayed by one of several cell sites that are in turn connected with the MTSO via a landline. The MTSO is ordinarily connected with a telephone company switching unit via a high-capacity landline or similar connection.

A status display 413 shows the status of the telephone unit 42. The status display 413 typically includes a NO SVC indicator to show that no cellular telephone service is available; and a ROAM indicator to show that the telephone unit 42 is outside its usual service area.

The transceiver 418 and antenna 410 are shown as being separate from the telephone unit or handset, but either or both could equivalently be built into the handset. The MTSO could equivalently be another telephone or similar unit if both telephones had appropriate signalling, switching, and call processing capabilities.

Those of ordinary skill having the benefit of this disclosure will appreciate that the signal exchange may utilize any of a wide variety of transmission systems that are equivalent for purposes of this description. These include, for example, radio, electrical-type wire (such as telephone landlines), modulation of light beams (e.g., in fiberoptic networks or laser beams), and so forth. The signal exchange may use one or more of these media alone or equivalently in combination. Whether specific components such as the antenna 410 are needed for a given implementation of the invention will depend in part on the transmission system selected for implementation.

The operation of the telephone unit 42 is controlled by logic circuitry 414. The logic circuitry 414 may be implemented in the form of a microprocessor which executes program statements stored in a storage device such as a read-only memory, or equivalently by discrete logic components or one or more custom semiconductor chips.

Those of ordinary skill will appreciate that a sequence of numbers to be dialed by the telephone unit 42 is processed by the logic circuitry 414 generally as follows, both in the prior art and in connection with the invention. Under control of the logic circuitry 414, the transceiver 48 transmits a cellular control signal to a cell over a signalling channel. The control signal includes a request that the MTSO dial a specified telephone number and assign a voice frequency or channel for use by the telephone unit 42.

The telephone unit 42 includes a read-write memory 416, accessible to the user and whose contents will not be affected by telephone power-downs of ordinary duration. For example, the memory 416 may equivalently comprise an EEPROM programmable by the user, a CMOS memory chip, or a conventional RAM with an independent power supply, any of which may possibly be implemented as part of a custom semiconductor chip.

It will be understood that telephones used in typical cellular systems are capable of generating both dual tone multi-frequency (DTMF) signals (DTMF signals produced by Bell telephones are referred to by the "Touch-Tone" trademark) and EIA standard IS-3-D cellular control signals.

Figure 5:
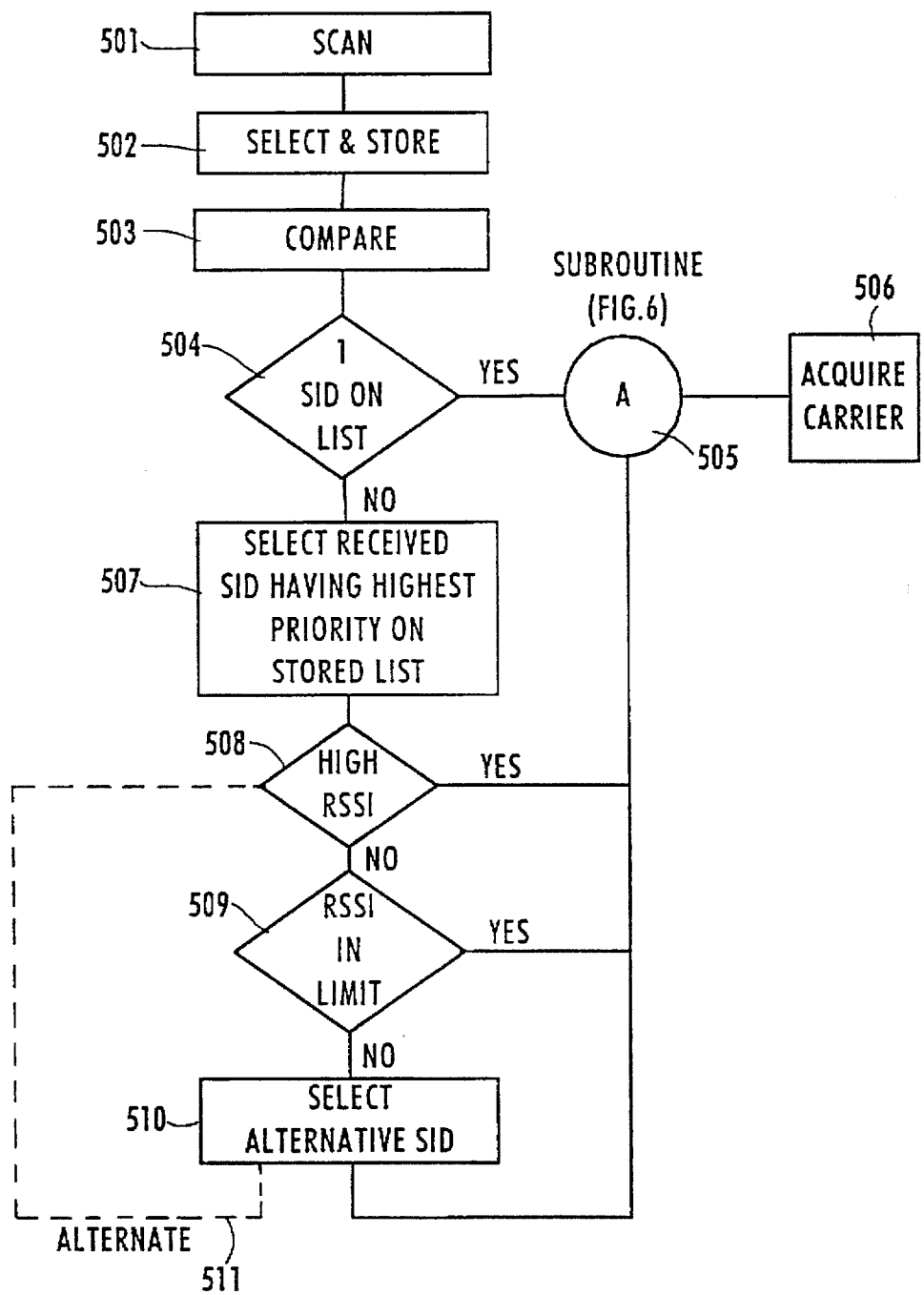
FIG. 5 is a flow chart depicting the operation of the present invention.
Figure 6:
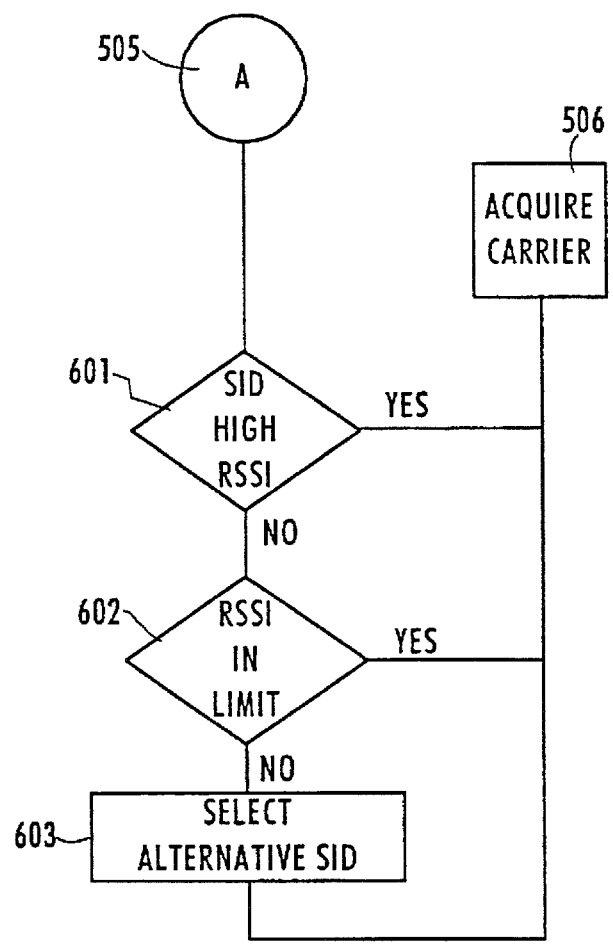
FIG. 6 is a flow chart depicting a sub-routine included in the operation of the present invention.

The present modified handset used to carry out the present invention can be programmed to handle both registration and hand-off in accordance with the operation depicted in FIGS. 5 and 6, or can be arranged to accommodate variations which would occur to those skilled in this art. It is noted that FIGS. 5 and 6 depict one example of an optimal, comprehensive system that it preferably applied in the registration operation of a roaming subscriber unit.

The present invention operates using the aforementioned modified handsets or any equivalent thereof in accordance with the process depicted in FIGS. 5 and 6. As previously stated, the SID is part of the overhead message that is sent to the mobile subscriber unit when it is powered up, and periodically thereafter. Normally when a mobile subscriber unit CMR is powered up, it scans the wireless systems operating within proximity to the mobile subscriber unit, taking signal strength readings in the various available frequency bands (cellular A and B, and PCS). This step is depicted at 501 in FIG. 5.

At step 502, at least one SID for each of the bands, as well as the corresponding Received Signal Strength Indication (RSSI) is stored at the subscriber unit. This function is preferably carried out in RAM70 of FIG. 3 or in the logic circuitry 414 of FIG. 4. Normally only a single SID and its RSSI are recorded for each of the bands. However, on a third or C band that is normally dedicated to Personal Communication Systems (PCS), at least two SIDs and their RSSIs will be stored by the subscriber unit.

The present invention also encompasses the capability of selecting and storing more than one SID for each of the bands scanned. One example of such a situation is in areas at the interface between two service providers. Another example is found in hand-off situations. In both such situations, the two strongest signals for each of the scanned frequency bands will be selected and stored by the subscriber unit.

At step 503, the SIDs of the scanned signals having been selected and stored are compared with a list of SIDs for preferred system providers. Such system providers usually have a special contractual relationship with the home service provider of the roaming subscriber so that the subscriber receives preferential treatment, normally in the form of lower usage rates. The list is normally pre-programmed into either a special memory such as EEPROM 72 (FIG. 3) or a microprocessor and logic circuitry 414 (FIG. 4). However, storage of the preferred SID list corresponding to preferred service providers can be carried out in any manner that would occur to those having skill in this art. The preferred SID list can also be modified or updated in any practical manner that would occur to one skilled in this art. The comparison operation is a simple logic operation meant to identify the received SIDs corresponding to those on the preferred SID list stored in the subscriber unit CMR. This comparison can be as extensive as necessary depending upon the number of received SIDs and the full extent of the pre-stored preferred SID list.

At step 504, a determination is made as to whether one of the received SIDs is on the preferred SID list stored by the subscriber unit. If only a single received SID is found to be on the pre-stored preferred SID list, a determination of "YES" is made at step 504 and the process continues to point A at which sub-routine 505, as depicted in FIG. 6 can be carried out.

After sub-routine 505 is carried out, the subscriber unit acquires a carrier frequency corresponding to the single received SID as depicted at step 506. Once the carrier (on a control frequency) is acquired, the handset initiates registration with the system provider corresponding to the single SID resulting from the comparison of the received SIDs with a preferred SID list. It is noted that sub-routine 505 at point A is optional and can be used or deleted depending upon the constraints of the overall system as well as the priorities of the system operator.

There are other circumstances under which a plurality of positive comparisons will take place at step 503, resulting in a plurality of received SIDs from which a subscriber unit must choose. There are a number ways of making this choice. In the conventional art, usually the first received SID found in the first positive comparison is selected as the service provider with which the subscriber handset will register. This approach can be used with the present invention as long as each frequency band is scanned and at least one received SID from each band is stored in the subscriber unit.

The present system provides techniques that ensure greater chances of successful communication being carried out between the subscriber unit and the selected service provider. One such technique is the assignment of priority within the pre-stored preferred SID list in the subscriber's station. Such priority could be based upon contractual considerations. However, this is not necessary. Rather, priority can be based upon RSSI or other system characteristics of the service provider that might further enhance the quality of communication between the subscriber unit and the system provider, as well as enhance communication between parties in communication with the subscriber unit via the service provider. One criterion for such prioritization can be the selection of a particular band such as the PCS bands under certain conditions. However, other characteristics of particular service providers can also be the basis of such prioritization, as long as the result is communication superior to that of other service providers accessible by the subject subscriber unit. Whether the criterion for priority be contractual or characteristic of a communication system, one of the received SIDs is selected at step 507 to be that which is most preferred for registration with the subscriber unit.

At step 508, the RSSI of the selected SID having the highest priority is compared to the RSSI of each of the received SIDs having a positive comparison with the pre-stored SID list in the subscriber unit. If the selected SID has the highest RSSI of this group, the process moves to point A and the option of carrying out sub-routine 505. If the selected SID is unchanged by sub-routine 505, the control frequency corresponding to a service provider having the selected SID is acquired by the subscriber unit and registration carried out with that system provider.

If the selected SID does not have a highest RSSI of the received SIDs having a positive comparison with the pre-stored preferred SID list, a biasing process is conducted at step 509. The biasing process is used to favor a selected SID having a higher priority but a lower RSSI (or other signal characteristics) than other received SIDs found on the preferred SID list. One technique is indicated at step 509 and is constituted by a determination that the selected SID is within a predetermined tolerance "window". This "window" is based upon a predetermined difference between the RSSI of the selected SID and the highest RSSI of any received SID found on the priority list. Since the whole purpose of this comparison is to bias the system in favor of staying with a higher priority SID based on the preferred SID list, the size of the "window" or of any other threshold can be determined by well-known statistical techniques.

However, such techniques are not necessary. A system operator could simply assign some arbitrary value based upon his or her own judgment reflecting a trade off between signal strength (call quality) and predetermined priority for selected system providers. If the RSSI of the selected SID is within the predetermined limits at step 509, the process moves to point A for the option to undergo sub-routine 505 as illustrated in FIG. 6. As previously stated, this sub-routine can be bypassed at the discretion of the system operator. If the selected SID remains unchanged after point A, carrier acquisition of a control frequency for the selected SID is conducted at step 506 as previously described.

If the RSSI of the selected SID is not within the predetermined limits used at step 509, the process moves to step 510 for the selection of an alternate SID. As indicated in FIG. 5, the alternate SID is selected and the routine moves to point A, and from there to the acquisition of an appropriate carrier frequency. The selection of the alternate SID can be based upon the received SID on the preferred SID list having the highest RSSI. An alternate routine is also possible as indicated by alternate 511 on FIG. 5. In this alternate, the alternate SID is based upon a level of priority of a received SID as determined by the priority of the SIDs on the preferred list stored in the subscriber unit CMR. Taking this alternative, a determination is made at step 508 if the new (alternate) SID has the highest RSSI (of all received SIDs found in the preferred SID list). The process of steps 508, 509 and 510 is repeated as before.

FIG. 6 is a flow chart depicting an optional sub-routine that can be carried out at point A of the FIG. 5 flow chart. Instead of carrying out the sub-routine, the SID selected in the flow chart of FIG. 5 can be the SID with which the roaming subscriber unit registers by acquiring a control carrier at step 506. However, there may be circumstances under which there is a wide disparity between the RSSI of received SIDs found on the preferred SID list and the RSSI of received SIDs not found on the preferred list. Consequently, some balancing must be done between the desire to use a preferred service provider and the necessity of ensuring high quality communication. This balancing has already been partially addressed by some of the steps in the flow diagram of FIG. 5. However, this is limited to a comparison of the RSSI of those received SIDs found on the preferred SID list. Other received SIDs may have much higher signal strength readings, making them better candidates for completion of a call even though the available rates are not as low as those from service providers on the preferred SID list.

At step 601, the RSSI of the selected SID is compared with that of all the other received SIDs to determine if the RSSI of the selected SID is the highest. If this is the case, then the control carrier of the service provider associated with the selected SID is acquired by the subscriber unit and registration carried out. If, on the other hand, the selected SID does not have the highest RSSI of all of the received SIDs available to the subscriber terminal, a comparison will be made at step 602 between the RSSI of the selected SID and that of the available SID having the highest RSSI value. This step can be conducted in the same manner as done at step 509 in FIG. 5. The selection of a "window" or a "threshold" depends upon the system operator's balancing of the desire for a higher priority service provider and the need for the highest quality communication. If the selected SID is within the tolerance ranges dictated for the step at 602, then the control frequency carrier of the system provider corresponding to the selected SID is acquired and registration carried out.

If, on the other hand, the RSSI of the selected SID is not within the limits set at step 602, an alternate SID must be selected as indicated at step 603. Based upon the process carried out in FIG. 5, the selected SID is assumed to be that having the highest RSSI of all of the received SIDs on the preferred SID list stored in the subscriber unit. Consequently, the only alternatives available for superior call quality will be received SIDs not found on the preferred SID list stored in the subscriber unit. Since there is no priority among the received SIDs not on the preferred SID list, the SID having the highest RSSI will be selected to ensure the highest call quality. Consequently, at this point, the selection of an alternate SID will be limited to a single choice.

It is noted that with the proper selection in criteria applied at step 502 in FIG. 5, steps 509 and the entire sub-routine of FIG. 6 can be eliminated. This would require that only those signals that have a sufficiently high RSSI for high quality communication will be considered, thereby obviating additional checks of RSSI for a selected SID. It is further noted that the use of steps 509 and 602 for additional RSSI comparison is necessitated only when there are a plurality of acceptable SIDs found on each of the frequency bands. Normally this is not the case in the A and B bands. The C band which is expected to be dedicated to PCS use, on the other hand, will provide a plurality of SIDs so that at least two SIDs will be selected and stored (at step 502) for the PCS band. It is further noted that there may be more than one PCS band, and each of these bands will provide at least two SIDs to be selected and stored at step 502. As previously stated, if the threshold parameters at step 502 are set high enough, even the PCS bands will normally not provide more than one candidate SID for selection and storage. Such threshold parameters are adjustable based upon the traffic, band allocation and other parameters known to the system operators and designers. The thresholds throughout the entire process depicted in FIGS. 5 and 6 are variable, and as previously stated, can actually be used to eliminate some of the steps as being redundant. The key to the operation of the present invention is the use of at least one signal from each of the bands for selection and storage, and later comparison to the preferred SID list.

While registration of a roaming subscriber unit is normally limited to the selection and storing of a single SID from each of the available bands during registration (except at the boundary between service providers), this is not the case for hand-off occurring at the boundary between cell site base stations. Because of this interface, there will be more than one strong signal on each of the bands. Consequently, it is necessary for the system to select and store the two strongest signals from each of the available bands.

The process depicted in flow charts of FIGS. 5 and 6 can be used to bias hand-off from a preferred service provider to a non-preferred service provider. Such biasing would take place at step 504 (FIG. 5). This biasing would inhibit hand-off from a weakening preferred service provider to a non-preferred service provider having a much stronger signal. As previously stated, the ratio between the two signals could be the key factor for determining when the delayed hand-off should finally take place. Thus, a modified version of FIG. 5 could be employed as part of the overall hand-off sequence. The SIDs available for hand-off would be selected and stored. The received SIDs would be compared to the stored preferred SID list to determine if a preferred SID was available for hand-off. A preferred SID could be selected based upon signal strength or priority of the stored SID list. A final comparison of the RSSI of the selected SID could be made to that of the strongest available SID. In this step, the biasing factor could be applied balancing the desire to use a preferred SID against the necessity for high quality signal characteristics. Based upon this last evaluation, either the selected preferred SID can be used as a hand-off target, or the strongest non-preferred SID can be used. In the latter case, hand-off from a preferred SID to a non-preferred SID can be delayed based upon differences in signal strength or any other factor that could be derived through normal statistical analysis. Such a statistical analysis is not necessary since the factor could be based solely on the judgment of the system operator.

It is significant to note that the present invention can be used to accommodate virtually any contractual arrangement between service providers, encompassing a wide range of system provider status and priority. These priorities can be balanced against measured signal parameters based upon virtually any criteria selected by the system operator. The purpose of any biasing done in this balancing between the two factors is done with the purpose of maintaining acceptable communication quality while keeping the price to the subscriber as low as possible.

It is noted that the operation of selecting the most appropriate available service provider based upon the pre-stored preferred SID list can be manually negated. This is most easily done through keypad 45 (FIG. 4). However, the manual override control is not limited to the depicted keypad. Rather, any control device occurring to one skilled in this art can be used with a handset modified in accordance with the present invention.

Because contractual relationships between system providers change, changes in the preferred SID list stored in the subscriber units will be necessitated from time to time. As previously described, updates of the preferred SID list can be entered manually using the keyboard on the subscriber handset. However, this process requires instructions from the service provider as well as a concerted effort on the part of the subscriber to make the necessary changes. Further, a subscriber does not normally know when to contact the service provider to receive updates in a timely fashion. It is also noted that a system provider may wish to download data in addition to that contained in the preferred SID list to individual subscriber units. Consequently, manual downloading of the preferred SID list and any accompanying data is inappropriate.

To better serve the subscriber, the updated preferred SID list should be automatically downloaded from the service provider to the subscriber handset as soon as the changes to the SID list have gone into effect. Further, for the convenience of the subscriber, the downloading operation is best conducted in a transparent manner, that is, the subscriber is unaware when the operation is being carried out. The only indication that need be made to a subscriber is a display of the most recent version of the updated preferred SID list, provided when a manual request is entered by the subscriber using the handset keyboard.

In order to carry out the aforementioned service of the subscriber, it is necessary to establish a wireless bidirectional communication path between the subscriber unit and a remote control center. The subscriber unit is activated when it is to receive the updated preferred SID list, as well as other data, over the communication path. This path can be constituted by both wireless and landlined links, depending upon the characteristics of the service provider. The subscriber unit can be selectively activated by the service provider communication system, or can receive the updated preferred SID list by way of a general broadcast. Authorization for carrying out this communication can be initiated within the communication system of the service provider, or can be initiated by the subscriber through the subscriber unit handset. In either case, identification (of the subscriber unit) is necessary to carry out a "handshake" process, assuring that the proper subscriber unit is receiving the proper information from the service provider communication system. One method for placing the subscriber unit in the program mode (to record the updated preferred SID list) is receipt of the predetermined sequence of tone signals using a Dual Tone Multi-Frequency (DTMF) receiver in the subscriber unit handset.

Figure 7:
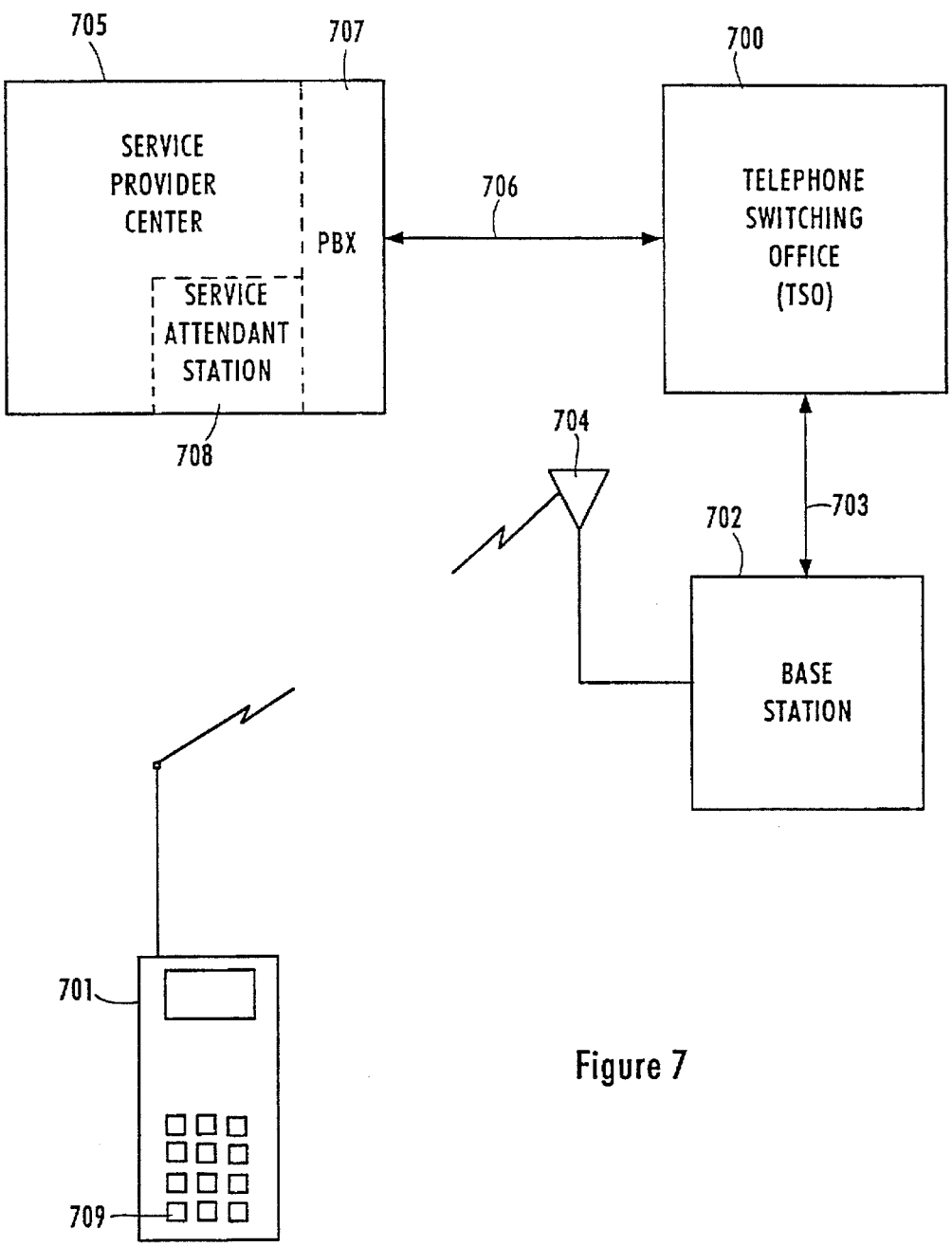
FIG. 7 is a block diagram of a comprehensive system for providing control data to a mobile radio telephone subscriber unit CMR.

Shown in FIG. 7 is a schematic representation of a wireless communication configuration which illustratively includes a telephone switching office (TSO) 100 which is adapted to link a wireless telephone set 101 into a regional or nationwide telephone network (not shown). A base station 102, coupled to the TSO 100, via a bidirectional communication link 103, is arranged to be in radio frequency communications with the wireless telephone set 101 via a radio frequency antenna 104. Also shown in schematic form, is a communications service provider center 105 adapted to be coupled to the TSO 100 via another bidirectional link 106. The service provider center 105 includes, inter alia, a telephone private branch exchange (PBX) 107, and a service attendant station 108 coupled to the PBX 107. It is well within the spirit and scope of the present invention that the wireless telephone set 101 may include a fixed wireless telephone station, a mobile/cellular telephone set, or a cordless-type telephone set.

Normally a mobile wireless telephone set, such as disclosed herein, may not initiate and complete radiotelephone calls until it is registered with and authorized for service by a service provider. All regular radiotelephone communication channels are blocked to unauthorized callers who are not registered and authorized for service. Virtually all service providers however do provide continuously unblocked service channels for permitting mobile wireless telephone sets to communicate with the service center without having prior registration and authorization. This is typically a 611 number and may be accessed by any handset whether it is presently authorized or not.

The principles and features of the present invention shall be hereafter described in connection with FIG. 7. Upon the purchase or lease of the wireless telephone set 101, a prospective subscriber would be assigned by the vendor or lessor a valid wireless (cellular) telephone number which typically would include an area or regional code number followed by a station number. In order for the subscriber to be able to use the wireless (cellular) telephone set 101, a telephone service provider or reseller, of the subscriber's choice, must authorize such use by programming the set 101 so that it is identifiable within the wireless telephone network as an authorized and legitimate wireless service subscriber/user.

One method of programming cellular subscriber unit 101 is achieved by having the subscriber dial, out of the set 101, a predetermined service center number to first establish a communication path over the unblocked service channel with the service provider center 105 via the radio antenna 104 and base station 102, the bidirectional link 103, the TSO 100 and the other bidirectional link 106. Once the communication path is established between the telephone set 101 and the service provider center 105, the subscriber/user can verbally, or by means of the telephone set dial, convey to an operator at the service attendant station 108 any requested subscriber-specific information. In accordance with an illustrative embodiment, the telephone set 101 is equipped with a program activating key 109 adapted to bridge an audio signal receiver (not shown), which is located within the telephone set 101, onto the then currently established communication path with the service center 105. In turn, the operator at the attendant station 108 would bridge an audio signal transmitter located at the center onto the communication path. The foregoing in effect couples the transmitter at the center 105 with the telephone set signal receiver so that the service operator can remotely enter information directly into the set 101.

As mentioned above, the information intended to be entered and stored in the telephone set 101 is specific to the subscriber owner or lessee. In the case of cellular mobile communication services, such information is referred to as Number Assignment Module (NAM) designation parameters. A sample of such NAM designations that can be remotely downloaded into the telephone set 101 are listed in the following table:

| System Identification | 00022 |
| Telephone Number | 2013866366 |
| Access Overload Class | 06 |
| Group Identification | 10 |
| Initial Paging Channel | 0334 |
| Security Lock Code | 6366 |
| Local Use Flag | 1 |
| A/B System Selection | 1 |
| Min Mark Flag | 1 |

The service operator at the station 108 can either use a telephone keypad as means for generating and transmitting the above NAM designation parameters, or alternatively can enter the above-listed information into a data terminal, e.g. a computer, that is coupled to a signal transmitter, e.g. a DTMF generator. In the above example, a total number of NAM characters to be transmitted includes 30 digits, with each digit having a value of 0 through 9. With the addition of an initial character to denote the beginning of transmission (e.g. "*"), an ending character to indicate the end of transmission (e.g. "#"), and, for example, a three-digit cyclic redundancy check (CRC) coding segment, the information is transmitted as follows:

*000222013866366061003346366111#BBB wherein BBB is a CRC 8 checksum byte. Once the above information is received, detected and stored in the telephone set 101, the latter is switched back into normal (i.e., voice) telephone service operation at which point the subscriber user is informed by the service operator that the telephone set 101 is fully programmed and ready for use.

Figure 8:
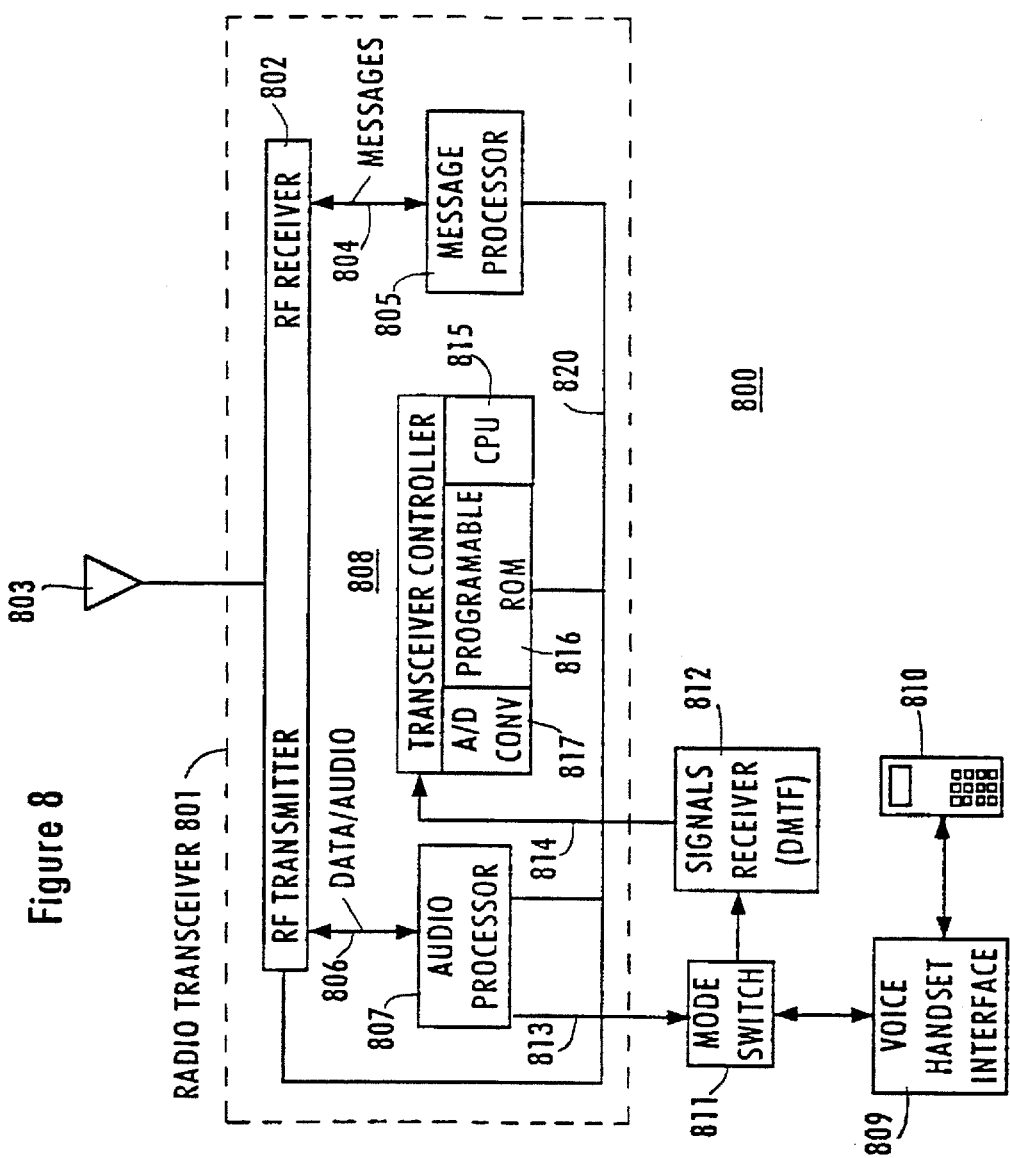
FIG. 8 is a block diagram depicting another example of a radio telephone subscriber unit capable of carrying out the present invention.

Another example of a subscriber unit handset configured to carry out the downloading operation of the present invention is depicted in FIG. 8. The subscriber unit CMR includes a radio transceiver portion 801 which includes a radio frequency receiver/transmitter 802 coupled to an antenna 803 and adapted to receive and transmit signals from and to a base station, e.g. a mobile cell site, or another wireless telephone. Coupled to the receiver/transmitter 802, via a bidirectional message connecting lead 204, is a processor 805 capable of receiving and processing system message-type signals. Also coupled to the receiver/transmitter 802, via another bidirectional lead 806, is a processor 807 adapted to process data signals as well as audio signals originating or received at the wireless telephone 800. Audio and data signals present on lead 806 are those signals intended for and derived from the antenna 803.

Within the radio transceiver 801, a controller 808 is coupled to the message processor 805 and the audio processor 807, via a control bus 820, which is also coupled to the receiver/transmitter 802. A voice handset interface circuit 809 interconnects the audio processor 807 and a telephone handset 810. In accordance with one illustrative embodiment, interposed between the voice handset interface 809 and the radio transceiver 801 is a mode switch 811, which in turn is coupled to a signals receiver 812. The latter is coupled via lead 814, to the transceiver controller 808. During the remote programming, or NAM designation parameters downloading, of the telephone set 800, the mode switch 811 diverts signals received at the antenna 803 and present on output lead 813 of the audio processor 807 to the signals receiver 812. The signals receiver 812 may be selected among known commercially available receivers, such as, for example, the Hitachi HD404678 4-bit microprocessor with an integral DTMF receiver. In the case where the programming signals out of the audio processor 807 and present on lead 813 are in digital form, the signals receiver 812 couples such digital signals to the controller 808 wherein an internal controller processing unit 815 directs such digital information for storage in a memory circuit within the controller 808, such as, for example, permanent read-only memory 816. Alternatively, if the programming information received at the antenna 803 is in the form of a sequence of tone signals, the receiver 812 (which in such case would be a tone signals receiver) would connect such signals to an analog-to-digital converter 817 located within the controller 808. The digital output signals generated by the converter 817 would next be stored in the memory circuit 816 under the control of the processing unit 815.

One technique for carrying out the updated preferred SID list download to subscriber units would be to send the update information as part of the normal overhead message that all mobile units receive during their normal operation. However, this technique would require changes in the cellular industry standards. This is a long and involved process and may not be considered feasible for the near future. The overhead message can also be used to direct subscriber units to tune to another frequency capable of handling the data content of the updated preferred SID list download.

This could be accomplished by inserting a character into the normal overhead message. Such a character would be indicative of the current version of the preferred SID list. The subscriber unit CMR to compare this version of the SID list with the current version stored within the subscriber unit. If the two versions are identical, the subscriber unit need take no further action. However, if the versions do not match, this difference is indicative that a new download of the updated preferred SID list must be made. The presence of a character representing the current version of the updated SID list could also signal the subscriber unit that another overhead message will be transmitted strictly for the purpose of updating the preferred SID list. For example, the additional overhead message could contain information directing the mobile subscriber to tune to a voice channel for the updated preferred SID list download.

Generally, the download of the updated preferred SID list is conducted within the geographic region served by the home service provider. While it is possible to update the SID list of a roaming subscriber, this operation requires additional manipulations resulting in a more complex operation. Downloading within the geographic area served by the home service provider is also preferable since the home service provider may customize the operation of local control. If a subscriber uses a Group ID Mark (GIM) of ten, the subscriber's handset will only recognize local commands at the least significant ten bits of the received SID matches the least significant ten bits of the preprogrammed SID stored in the handset. This implies that local control will typically work only for home mobile subscribers, or those which meet the above-mentioned criteria for roamers.

The protocol for downloading updated preferred SID lists follows standard registration protocol in which current word links for local control are as follows. The Forward Control Channel (FOCC) is sixteen bits; the Reverse Control Channel (RECC) is five bits; the Forward Voice Channel (FVC) is five bits; and the Reverse Voice Channel (RVC) is five bits. Normally these fields are error-corrected.

In a first version of the present invention for downloading an updated preferred SID list to subscriber units, the version number of the current SID list is maintained in a central controller (such as service provider center 705 in FIG. 7). During the downloading operation, the current version number is broadcast over the FOCC. If a mobile unit recognizes that its own prestored SID list is older (a lower version number) than that of the version being broadcast, the mobile unit will initiate a SID list download over the RECC. The system (preferably through a base station such as 702 in FIG. 7) will complete a call to the mobile subscriber unit, informing that unit that the SID table is being downloaded through a voice channel. The system then sends the mobile subscriber forward over the FVC. The first five bit word uses four bits for the version number of the current preferred SID list being downloaded to the mobile subscriber. Normally, the most significant bit is set to "one" in order for an addition to be made to the stored SID list in the mobile subscriber unit, and set to "zero" for a deletion from the SID list stored in the mobile subscriber unit. Normally the next three words will be the fifteen bit SID to be added or deleted. After each forward transfer, a mobile subscriber unit sends a code over the RECC to signify that correct completion of the transfer has occurred. If the four words are not properly received by the mobile subscriber unit, the mobile subscriber unit sends a code requesting re-transmission over the RECC.

After all the SIDs are downloaded from the communication system to the mobile subscriber unit, the system sends a code over the FVC to the mobile subscriber unit signifying that transmission is ended. The mobile subscriber unit then updates the version number of its current preferred SID list, confirming the end of transmission status over the RVC.

In the aforementioned version of the present invention, the overhead message containing the latest version number of the preferred SID list is broadcast to any mobile station in range of the base station making the broadcast. It is noted that the base station broadcasts are controlled by a mobile telephone switching office 700 (in FIG. 7). However, the present invention is not limited to this technique. In an alternate embodiment, each of the mobile subscriber units in a geographic area controlled by a MTSO is individually addressed to receive the most recent version of the preferred SID list. The MTSO keeps tracks of each of the subscriber stations within its geographic area, and thus, can keep track of each subscriber station that has been provided with the most recent version of the preferred SID list. While a record can be kept in either the MTSO or each of the base stations of each of the subscriber units within the system having the latest version of the preferred SID list, this is not necessary. Rather, in the alternative, each of the base stations can automatically continue to update each of the subscriber units within its geographic area. The subscriber units can be addressed sequentially for the download, and the sequential address repeated once the entire list of subscriber units has been addressed. Records of subscriber units with updated preferred SID lists need not be kept.

One way of addressing each of the individual subscriber units is through the technique of "alert and flash" carried out on a control channel or as part of the overhead message. The "alert and flash" message contains information regarding the voice channel to which the subscriber unit is tuned to receive further data. The "alert and flash" message also includes other information regarding the content of the data which is to be downloaded over the voice channel. Such data could contain the latest version number of the preferred SID list. If that particular subscriber unit has already received that version, a comparison within the subscriber unit handset will indicate that it is not necessary to tune to the voice channel to receive the download. Consequently, the subscriber unit is forewarned that it is not necessary to tune to the voice channel for the data download. It is noted that the "alert and flash" technique can be used with both analog and digital handsets. The operation of the present invention is not limited to either type of handset that is meant to encompass any form of subscriber unit that can carry out the selection of a service provider based upon a predetermined SID list which is automatically downloaded on a timely basis from a communication system.

In the alternative, the individual subscriber unit can receive instructions specified only for that unit to tune to a traffic or a voice channel. Upon tuning to the required channel, the subscriber unit will receive an "alert and flash" signal indicating the nature of the data to be downloaded into the subscriber unit. As previously described, the subscriber unit can use the data in the "alert and flash" signal to determine if a download is appropriate or not. The latest version of the preferred SID list is only one example of such data contained in the "alert and flash" signal.

Other types of data can be used to allow a subscriber unit to make the decision to receive the downloaded data or to not receive the downloaded data. Using this technique, it is not necessary that the MTSO keep track of each of the mobile subscribers in its geographic area that have received the updated SID list since that responsibility can be given to each of the mobile subscriber units. Other mobile subscriber units are not accessed until specifically selected since the message is addressed to just one mobile subscriber unit.

It is noted that a base station may send simultaneous instructions to a plurality of different mobile subscriber units, directing them to tune to separate (or the same) voice or traffic channels to receive the download of the most recent version of the preferred SID list, as well as other data considered appropriate. As a result, mobile subscriber units not designated will not receive the updated preferred SID list download. Because only those subscriber units designated are directed to tune to the designated voice channel, a general broadcast of the updated preferred SID list, as well as other relevant data, can be made on the assigned voice channel. This simplifies the downloading of the preferred SID list since a download can take place periodically and the system control mechanism does not have to keep track of the preferred SID list status of each of the mobile subscriber units in the geographic area of the communication system.

It is noted that one arrangement in a handset for receiving the preferred SID list download includes a modem such as 76 in FIG. 3) capable of receiving the downloads from an Intelligent Peripheral (IP). The IP can be an adjunct processor attached to a telephone switching office or MTSO 700 (depicted in FIG. 7). The IP will keep track of the latest versions of the SID list as well as other relevant data that may be downloaded with the SID list. It is noted that the IP can be part of the service provider center 705 or used in any part of an Advanced Intelligent Network (AIN) with which the service provider is associated. Consequently, if the mobile telephone switching office 700 is serviced by an SSP type switch, as part of a landline network associated with the mobile telephone system, the IP can be associated with that SSP switch. A disclosure of an AIN is found in U.S. Pat. No. 5,247,571 to Kay et al. (incorporated herein by reference). Further, the description of IPs and their use are found in U.S. patent application Ser. No. 08/248,980 (incorporated herein by reference).

Another method of updating the SID list includes the use of a PCS base station (similar to a cordless base station) as disclosed in U.S. Pat. No. 5,353,331 (incorporated herein by reference). The method of the present invention can be carried out by a download of the updated preferred SID list from the PCS home base station over cordless telephone frequencies to the subscriber unit handset. The PCS home base station would be provided with the updated preferred SID list via landline through the use of an AIN. When the subscriber unit handset registers with the PCS home base station, the registration process could include an inquiry to the AIN controlling of the landline system regarding the status of the latest preferred SID list. This inquiry could be part of the handshake/registration process so that once registration is confirmed, and the location of the subscriber unit handset known, SID list data could be downloaded through the AIN over CCIS lines, sent through the SS7 switch to the PCS home base station. From there, the relevant data could be transmitted via cordless telephone channels to the subscriber unit handset from the PCS base station. In the alternative, the handset may be plugged into the PCS base station for a direct download via hardwire connections. In another version, infrared emitters could be used to transmit the relevant information between the PCS base station and the subscriber unit handset.

If a Personal Phone Number (PPN) is used, a request for a SID list download to the subscriber unit handset can be made with the request for cellular call forwarding. This request can be made by the cordless base station with which the subscriber unit handset as registered. The cordless base station can make the request via an AIN, or an IP associated with the SS7 switch feeding the cordless base station. The cordless base station can also control the subscriber unit handset to request the downloading of the most recent SID list on an appropriate voice channel. If the subscriber unit handset is to receive a download of the most recent version of the preferred SID list over cellular channels, it will be necessary that this be done before the cellular portion of the subscriber unit handset is deactivated by the base unit.

Another technique for downloading the updated SID list into the subscriber unit handset includes the use of a "smart card" to be inserted into an appropriate interface on the subscriber unit handset. Such a "smart card" would be provided by the service provider so that manual updating of the preferred SID list could be done by the subscriber. Such a "smart card" could also be used in conjunction with a home base station such as that used with the PCS or PPN systems. However, such manual downloading includes all the problems and inconvenience previously mentioned, and so is generally not considered to be particularly beneficial to the subscriber except in those cases where maintenance or manual programming is considered desirable.

One such case exists for the PPN system when a subscriber is roaming from his or her home geographic area, and desires an arrangement whereby the roaming subscriber unit is considered to be in its home service provider area. In order to do this, a second home base station will have to be programmed to accept the roaming subscriber unit as a home subscriber unit. This can be accomplished by making an arrangement whereby the identification number of the foreign base station is treated like a SID and programmed into the roaming subscriber unit handset into the preferred SID list. When the roaming handset is within range of the foreign base station, it will be recognized as a home hand set hand treated accordingly, resulting in a lower billing rate for the roaming handset. As a result, a plurality of different subscriber unit handsets having access to a plurality of different foreign base stations. All that is needed is that the identification number necessary for a handshake routine with the foreign base station be treated as a preferred SID and programmed into the subscriber unit handset that is expected to roam.

The time and circumstances during which preferred SID list download may take place is not limited to that previously described. Rather, it is possible to download a SID list when incoming communication is being established with a subscriber unit handset. The downloading of the preferred SID list can take place between rings of an incoming call to a mobile subscriber unit, or before the subscriber at the mobile unit answers the incoming call. Downloading under such circumstances would establish beyond any doubt the identity of the mobile subscriber unit being provided with the updated preferred SID list. Extending this concept one step further, it is possible to perform the downloading of the updated preferred SID list in virtually any space found on the voice channels between voice communication traffic.

It is noted that an updated SID list downloaded into a subscriber unit handset after communication has begun may result in the recognition that communication has been established using a service provider that is now considered inappropriate on the basis of the updated preferred SID list. Consequently, it may be necessary to apply certain safeguards to prevent re-registration with a new service provider once communication has already begun. While such circumstances are considered rare, their occurrence may jeopardize high quality communication especially when hand-off is required. The programming that prevents re-registration during an ongoing telephone call is easily accomplished by one skilled in this art, and requires no further elaboration.

Likewise, techniques for bypassing the preferred SID list function are well known and easily carried out by those having skill in the art of programming cellular handsets. Thus, a subscriber may choose his or her own service provider regardless of the preferences stored in the SID list by carrying out a manual override using the keyboard on the subscriber unit handset or any other appropriate controls arranged to carry out such override functions.

One example of the other data that can be downloaded with the updated preferred SID list is a list of calling features that are available from service providers associated with each of the SIDs. One way of handling such an arrangement would be for the above-described selection using the preferred SID to be carried out and the registration with the associated service provider to be accomplished in order to activate any of the calling features listed along with selected SID. The subscriber unit handset could be so programmed to indicate which of the calling features the subscriber is authorized to use by way of signals sent over a reverse control channel to the base station currently serving the subscriber unit handset.

A manual designation could be made by the subscriber operating the handset of which services he or she wishes to have in effect while registered with the new service provider. If the programming in the subscriber unit handset is considered insufficient to indicate proper authorization to use particular services, the MTSO of the current service provider could send a query to the home service provider to determine if such services are authorized to the subscriber. One method of carrying out such an inquiry could be over dedicated trunks connected the MTSOs of the different service providers. Another system could be the use of AIN connecting the MTSOs of the different service providers.

Normally, the aforementioned downloading of the updated preferred SID list is carried out within the home region of the cellular subscriber. The downloading operation is usually carried out by any base station appropriate for the location of the mobile subscriber unit. The operation of any of the base stations to download the updated preferred SID list is controlled to a large extent by the overall configuration of the system to which the base station belongs.

In one example of the operation of base stations to provide data to mobile subscribers within particular cell regions, the transmission channel of each base station is assigned as a simplex message transmission channel in which a given base station transmits to the mobile station information described in the structure of the control channels. Such information includes references to message transmission channels of adjoining base stations and references to one or more control channels assigned to the given base station. Since the message transmission channels are at a higher level in the hierarchy references than the control channels, accessed by several different kinds of subscriber sets and different services can be provided by transmitting a relatively small number of references.

When applied to the downloading of the updated preferred SID list, the aforementioned arrangement can also use other channels to provide additional information, such as service features available from a particular service provider. The other message channels can also be used to provide information from other service providers and characteristics of non-home regions offering cellular service.

While substantial amounts of information can be easily downloaded using such techniques when the subscriber unit is within the geographic area of the home service provider, this capability is sharply curtailed when the subscriber unit moves into a geographic area of a non-home service provider. Extensive information via base stations is not feasible in foreign geographic areas since there is substantial difficulty in obtaining updated information that would be useful to roaming subscriber units from a plurality of different service providers. Further, the volume of available data, such as updated preferred SID lists and features available from each of the service providers associated with each SID, make the use of base stations to provide updated SID lists to foreign subscriber units which have laundered into the geographic area of a particular base station, very difficult. Thus, in many circumstances providing updated preferred SID lists to foreign subscribers may not be practical.

Because of the increasing number of service providers and the increasing number of frequency bands available to them, a roaming subscriber scanning each of the control frequencies to collect at least the two strongest SID signals for each of the frequency bands becomes increasingly time consuming and problematic. Generally such scanning time results in the loss of any communication being conducted as well as an annoying lead time necessary to establish registration in the foreign system.

In order to address both of the aforementioned drawbacks, a compact, comprehensive technique is necessary to quickly provide necessary SID list information to roaming subscribes. Since large numbers of roaming subscribers would interface with such a system, security measures would also be necessary to safeguard the data of each of the service providers, and to ensure that each of the subscriber units received only appropriate information.

One solution of the aforementioned drawbacks is the use of a beacon using a single pilot tone frequency to which all mobile subscribers in a predetermined geographic area would tune to obtain registration data such as a SID list of those service providers operating within the geographic area covered by the beacon. Thus, instead of a roaming mobile subscriber scanning each of the control frequencies to obtain a list of all SIDs available in a particular area, the sought-after list would be presented to the roaming subscriber by means of the beacon. It is expected that mobile subscribers could be programmed to automatically tune to the aforementioned pilot tone frequency to obtain any of the following information: the identity of a single service provider operating in a predetermined area so that mobile subscriber would have no choice but to register with that service provider; the control frequency dedicated to those subscribers of particular service providers; control frequencies used to direct the roaming subscriber to various voice channels to receive different types of data such as updated SID lists although service providers are operating in the subject geographic area. It is noted that different pilot tone frequencies, as well as different beacons could each be directed to specific service providers to the exclusion of other service providers. Consequently, subscriber unit handsets from a home area controlled by a particular service provider would be programmed to seek pilot tone frequency of only beacons dedicated to that service provider.

In the alternative, a more versatile beacon arrangement would include programming of individual subscriber unit handsets to automatically tune to a pilot tone frequency at which data would be broadcast to any subscriber unit handset within range. The broadcast could include a home SID and a voice or controlled channel frequency to which any handset having that SID as a home service provider could tune. The frequency to which the handset then tunes would provide the updated SID list for service providers operating within the range of the beacon. The handset could then conduct the comparison of available SIDs to the pre-stored SID list contained within the handset. It is possible that the SID list provided via the beacon could obviate the necessity of storing a SID list within the subscriber unit handset. However, use of the preferred SID list within the handset allows prioritization based upon the circumstances of each subscriber. Thus, each subscriber could have prioritization based upon his or her contractual arrangements with the home service provider, as well as foreign service providers. Consequently, while the elimination of the stored SID list in the subscriber handset is possible using the SID list provided via the beacon, such elimination is not necessarily desirable in all cases.

A key consideration in the use of a beacon covering a predetermined geographic area is a definition of the boundaries of that geographic area, and means by which a subscriber unit "knows" that it is still within a particular geographic area, as opposed to another geographic area being serviced by another beacon. An example of one system for making such a determination includes a plurality of marker transmitters located throughout the cellular service area. A marker signal is transmitted by one or more marker transmitters such that the marker signal can be received by a mobile unit in a radio frequency coverage area that is substantially coincident with the boundaries of the zone. Included in the marker signals are zone identification signals that are unique to each zone or beacon coverage area. The mobile unit could be pre-programmed with the zone identification signal for one or more particular preselected zones. Each mobile unit monitors a marker channel to receive the marker signals transmitted by the marker transmitters. If the mobile unit receives the zone identification signals for the particular preselected zones, an indication of such status is provided to the user. Additionally, upon call initiation, a signal is transmitted to the cellular service system that indicates the mobile unit is in zone.

To further facilitate operation of this system, the marker signals could include a synchronizing code that allows a mobile unit to synchronize itself with a series of time slots within which data is transmitted by the plurality of marker transmitters. In the alternative, the marker transmitters may transmit a jamming signal during the time slot when a zone identification signal is being transmitted by another marker transmitter to further shape the radio frequency coverage area in which the zone identification signal can be received by the mobile unit. The power level at which the marker transmitters transmit the zone identification signals and jamming signals can also be varied to shape the radio frequency coverage area. A zone computer is coupled to each of the marker transmitters via a communication link to control the power level at which the marker transmitters transmit.

It is noted that when a beacon area covers more than one service provider area, the chances are increased that the roaming subscriber unit will have to choose between foreign service provides that have special arrangements with his home service provider. The chances are also increased that the mobile subscriber will have to bias or weigh signal qualities against the prioritization On the pre-stored SID list.

While the new use of a beacon eliminates the time factors required for scanning every control channel to obtain the list of available SIDs in a particular geographic area, another problem exists in that substantial amounts of communication system control channel and voice channel capacity may be used up simply to advise roaming subscribers of basic SID lists and feature information. Further, the range of the pilot tone signal may be inadequate if limited to cellular frequencies. This is especially true if a plurality of beacons is to be used in a given geographic area. As previously indicated, each beacon could be dedicated to a single service provider and could be used to provide more than SID list and control frequency information.

One solution to these drawbacks is the use of out-of-band signaling. In one system for providing out-of-band signaling, each broadcast message transmission comprises, in a typical arrangement, a group of 16 bits within a "frame". Multiple frames can be sent in succession indefinitely to develop longer messages. Each transmission includes an address portion and a message portion so that only those remote devices whose address corresponds to the address portion of the given message will respond to that message. Such addressing methods are well known in the computer and digital art.

The broadcast station is equipped to periodically transmit specially coded synchronizing signals. Once synchronized, the plurality of remote devices can immediately distinguish the beginning and ending of any particular frame, thus all the digital clocks at the remote locations will all be synchronized to a common time reference. In addition, supervisory signals comprising standard digital patterns are transmitted upon command of a central computer so that the remote locations can be alerted to perform specific functions, such as seizing a telephone line, cause transmission of specific data, or performing a local machine operation, etc.

Figure 9:
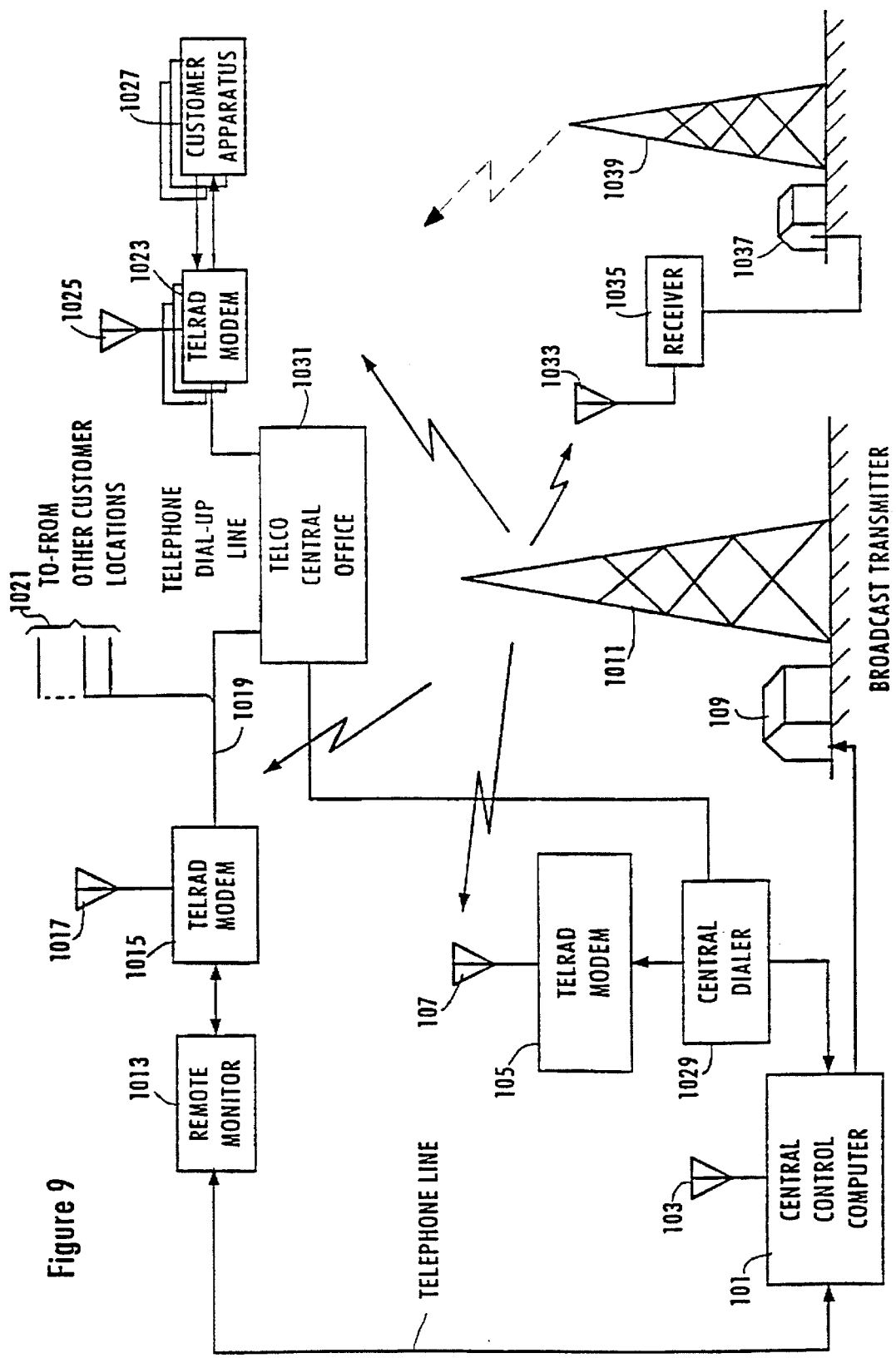
FIG. 9 depicts a beacon broadcasting system capable of carrying out the operation of the present invention.

FIG. 9, depicts a system that can be used to carry out the present invention. An existing commercial broadcast station transmitter 109 generates radio signals which are radiated by antenna 1011. Transmitter 109 is modified to incorporate phase modulation means which superimpose on the transmitted signal the new signals required to supervise, synchronize and transmit information to a plurality of remote devices. A phase modulation method wherein a digital bit stream phase modulates the carrier of an AM broadcast station. The bit streams clock is synchronized to the carrier frequency of the broadcast station by frequency divider mean. Such a phase modulator is incorporated within transmitter 109. It periodically modulates the existing transmitter in a non-interfering manner to transmit synchronizing signals (such as once each hour), so that the remote devices tuned to the broadcast signal can synchronize their digital clocks, frames, and other events. A device called a TELRAD modem is made a part of each remote device. The TELRAD modem includes a radio receiver tuned to the frequency of the broadcast station 109, and special circuits to detect synchronizing signals and messages.

Messages originate at central control computer 101 and these are sent to transmitter 109 via a dedicated telephone line, or other conventional communication method. A central TELRAD modem 105 detects the transmissions from the broadcast station to enable comparison of these messages with the messages generated at co-located central control computer 101 to determine if any errors exist and if so, these messages are regenerated by computer 101 and sent to transmitter 109 for retransmission.

Thus all messages which are to be sent are generated by central control computer 101. The hourly synchronizing signals are generated by special equipment at transmitter 109. These are conveyed to central control computer 101 over the telephone line between 101 and 109 and also directly over the air through antenna 103; it being understood that a receiver for this purpose can be included within computer 101. TELRAD modem 105 can also be located at central control computer 101 along with a computer controlled phone dialer 1029, depending upon whether the remote devices are to communicate directly to the central control computer site via telephone lines, or to remote monitors 1013, or both. In a typical system, a plurality of TELRAD modems 1023 receive synchronizing signals continuously from broadcast station 109 through their antennas 1025. TELRAD modem 1023 is therefore always prepared to receive supervisory signals or messages originated from central control computer 101. These messages are sent to and from associated customer apparatus 1027, which apparatus might be a computer terminal, automated office equipment, load management devices, or an electric utility power meter as may be necessary for remote meter reading applications, and the like.

TELRADmodem 1015 detects the signals from broadcast station 109 through its antenna 1017 and this modem may be connected to a remote monitor, such as a small minicomputer with CRT display, so that information from customer apparatus such as power meter readings can be collected and recorded or displayed. The object is to provide a means whereby remote monitor 1013 can communicate to a plurality of customer apparatus 1027 through Telco central offices 1031 over ordinary phone dial-up lines 1021. Establishment of this communication link and the associated synchronized data transfers is accomplished by TELRADmodem 1015 and 1023. These devices are in turn synchronized and supervised by signals from broadcast station 109.

Another feature depicted in FIG. 9 is provision of a "repeater broadcast station" 1037 and its associated antenna 1039. This repeater station includes a receiver 1035 which detects the signals transmitted from broadcast station 109 through antenna 1033 and subsequently modulates transmitter 1037 in the same manner as central control computer 101 modulates transmitter 109. Obviously a phone line between computer 101 and transmitter 1037 could also be used. Thus transmitter 1037 can repeat signals in its local area and thereby extend the area covered. The TELRAD modem locks to and detects only signals from the stronger of the two or more broadcast stations.

Central dialer 1029 and remote monitor 1013 can communicate with a plurality of TELRAD modems 1023 through a multiplicity of phone lines 1021. TELRAD modem 105 and 1015 are functionally identical to TELRAD modem 1023, however, they include a plurality of parallel circuits and/or switching means to permit them to communicate simultaneously with many customer apparatus 1027 through their companion TELRAD modems 1023.

It is noted that only the pilot tone frequency be constituted by an out-of-band signal while the cellular control frequencies and voice frequencies are used to convey additional data to the roaming subscribers. In the alternative, the subscribers may be directed to tune to other out-of-band frequencies to obtain the information (such as the available SID list) normally obtained using the cellular voice and control channels. These additional out-of-band signals can be transmitted in the same manner described with respect to the single pilot tone frequency.

The advantages of AM transmissions have already been described. In particular, the range of AM transmission permits one beacon to cover a geographic area encompassing a plurality of service providers on the same cellular frequency bands. However, the geographic area covered by a beacon need not be as large as an area requiring several service providers to achieve full coverage. Instead, a beacon can be used for a geographic area encompassing only the area covered by a single cellular service provider. One example of such a limitation and geographic area includes a beacon that is limited to the use of a single cellular service provider. Using such an arrangement, all subscriber unit handsets have a particular cellular service provider as the home service provider would be programmed to automatically tune to the beacon frequency when the handset detected a roaming condition. The data provided by the beacon could include (but not be limited to) the control frequency of the home service provider and its affiliates. The data can also include the control frequency of a local cellular service provider with which the home service provider has special contractual relationships. While the roaming subscriber may be accessed, a surcharge for roaming, in both cases, the roaming subscriber will receive beneficial treatment as a result of the affiliation or contractual relationship with the home service provider. However, the roaming subscriber will not have the choice of selecting a foreign service provider. Rather, upon roaming, the cellular subscriber unit handset will tune automatically to the beacon frequency to receive instructions regarding the proper control frequencies with which to carry out registration with the foreign service provider into which area the roaming subscriber has moved. Preferably, this arrangement will broadcast the SID of the home service provider as in a way of addressing the appropriate subscriber unit handsets, and as an element of carrying out registration with the foreign service provider. While the SID is not necessary (since only those subscriber unit handsets pre-programmed to tune to the subject beacon frequency will tune to the beacon frequency and be instructed thereby), the use of the home service provider SID can provide a greater level of security that what exists in the absence of the home service provider SID broadcast by the beacon. It is expected that subscriber unit handsets not programmed to respond to the home service provider SID would not be directed to the control frequency of the foreign service provider even if such handsets tuned to the beacon frequency.

The use of a SID is more critical to the present invention when the beacon is used to broadcast a plurality of cellular service providers operating within range of the beacon. Such an arrangement operates in a manner similar to that described above using only a single service provider. In the second arrangement, each subscriber unit handset is pre-programmed to tune to the beacon frequency. Each of the subscriber unit handsets will respond to the broadcast of the SID to which the handset is pre-programmed. This response will take the form of tuning the control frequency of the service provider corresponding to the pre-programmed SID. Registration with the subject service provider can be carried out, or additional information can be obtained in response to messages transmitted on the subject control frequency. As previously stated, the capacity of the control frequencies is limited. Consequently, unless the roaming handset is programmed to have no choice in the selection of foreign service providers with which to register, the roaming subscriber unit handset will have to tune to a voice frequency to obtain additional data. The controlled channel will generally be used only for registration between the roaming subscriber unit handset and the foreign service provider.

It is noted that the beacon can broadcast the SID list of available service providers and a corresponding control frequency for each SID. The handset need not be triggered by a reception of its home service provider SID. Rather, the handset can go through the list of available service providers, and make a selection based upon a pre-stored SID list within the handset. The selection can be done as previously described with respect to the use of the basic SID list for selecting the most economical service provider. If a substantial number of service providers are contained in the geographic area of a beacon, the time necessary to broadcast the SID list and accompanying control frequencies may be counterproductive to the effective registration of roaming subscriber unit handsets. One solution to such a situation is already found in the use of a broadcast of only the home service provider SID for each of the cellular subscriber unit handsets expected to enter the geographic area of the beacon.

Using receipt of only the mobile subscriber unit handsets home service provider SID, the subject handset would tune to a pre-programmed control frequency for additional instruction, such as the registration message.

In the alternative, the handset could be directed to a voice channel associated with the home service provider SID pre-programmed into the handset. Data on the voice channel could include a preferred SID list based upon service providers found in the geographic area of the beacon, as well as the control frequencies of each of the service providers associated with each SID on the preferred list.

The data provided by the voice channel can include a list of features and calling services available from particular service providers on the SID list. Instructions for obtaining such services can also be provided.

Another alternative of the present invention would include more than one AM broadcast by the beacon. Such additional broadcasts could include the aforementioned SID list of available service provides, as well as calling features available with each. It is noted that any out-of-band frequency providing this information would be helpful with respect to overuse of the present cellular frequency bands. Such out-of-band broadcast or data frequencies could include Frequency Modulated (FM) transmissions. The key to the use of extra broadcast frequencies and data frequencies is to relieve the overuse on the existing cellular telephone frequencies.

Depending upon the information provided from the beacon and cellular channels to which the beacon directs roaming subscribers, periodic updating of data provided by the beacon and such cellular channels may be necessary. Since the beacons are expected to cover all the territory serviced by cellular telephone providers, a substantial network will be necessary to provide updated information to the beacons and to the mobile telephone switching offices controlling those frequencies referred to by the beacons. One technique for updating the beacon data as necessary, includes the use of an Advanced Intelligent Network (AIN) described in U.S. Pat. No. 5,247,571 to Kay et al. (incorporated herein by reference). The techniques for distributing information to mobile telephone switching offices via an AIN are disclosed in U.S. Pat. No. 5,353,331 issued Oct. 4, 1994 (incorporated herein by reference). The second patent discloses the use of visitor location registers and home location registers to stored data that can be used by a local MTSO to control cellular telephone traffic. Such data could include a SID list from which a roaming mobile subscriber would select the most appropriate local service provider.

While the beacon is not disclosed in either of the two aforementioned patents, the AIN feeding data to the registers and the local MTSO can also feed data to the beacon through a local switching office (SS7), and can use an Intelligent Peripheral (IP) to store or otherwise manipulate data to be used by the beacon.

It will be readily seen by one of ordinary skill in the art that the present invention fulfills all of the objects set forth above. After reading the foregoing specification, one ordinary skill will be able to effect various changes, substitutes of equivalence and various other aspects of the invention as broadly disclosed herein.

Although a number of arrangements of the present invention have been mentioned by way of example, it is not intended that the invention be limited thereto. For example, the present invention can be adapted to use a plurality of different beacon configurations, including a selection of cellular base stations. It is therefore intended that the protection granted hereon be limited only by the definition contained in the appended claims and equivalents thereof. Accordingly, this invention should be considered to include any and all configurations, modifications, variations, combinations or equivalent arrangements falling within the scope of the appended claims.

We claim:

1. A control system for a plurality of radio telephone subscriber units, comprising:

(a) means for broadcasting a list of System Identification Number (SID) and associated control frequencies for each service provider operating within range of said means for broadcasting, said means for broadcasting comprising a single beacon operating within a predetermined geographic area, said beacon operating on an Amplitude Modulated (AM) broadcast frequency;

(b) means in said radio telephone subscriber units for automatically tuning to a frequency on which said means for broadcasting operates when said radio telephone subscriber unit is roaming; and (c) means in each said radio telephone subscriber unit for carrying out a communication operation responsive to receipt of said SID list from said means for broadcasting.

2. The control system of claim 1, further comprising means for identifying each service provider operating within range of said means for broadcasting.

3. The control system of claim 1, wherein said communication operation comprises tuning to a control frequency broadcast with a corresponding SID.

4. The control system of claim 1, wherein said communication operation comprises comparing received SIDs from said means for broadcasting with a preferred SID list stored in said radio telephone subscriber unit to select a received SID corresponding to a preferred service provider for registration by a corresponding radio telephone subscriber unit.

5. The control system of claim 4, wherein said means for broadcasting broadcasts a single SID and an associated control frequency.

6. The control system of claim 4, wherein said means for broadcasting broadcasts a single SID and each said radio telephone subscriber unit includes means for storing a list of control frequencies corresponding to a list of SIDs.

7. The control system of claim 4, wherein said means for broadcasting broadcasts a plurality of SIDs, and each said radio telephone subscriber unit includes means for responding only to a received SID corresponding to a home service provider of each respective radio telephone subscriber unit.

8. The control system of claim 1, wherein said beacon broadcasts a list of calling features available with each SID broadcast by said means for broadcasting.

9. A radio telephone subscriber unit comprising:

(a) means for automatically tuning to a first predetermined frequency when a roaming state is detected;

(b) means for responding to receipt of a System Identification Number (SID) corresponding to a home service provider of said radio telephone subscriber unit while said radio telephone subscriber unit is roaming; and (c) means for carrying out a communication operation responsive to receipt of said SID, wherein said communication operation comprises tuning to a control frequency accompanying said SID and further comprises means for automatically tuning to a control frequency stored in said handset and corresponding to said SID, wherein said communication operation still further comprises automatically tuning to a voice channel to receive a data download of at least a list of preferred SIDs.

10. The handset of claim 9, wherein said data download further comprises a list of calling features available with each SID on said preferred SID list.

11. The handset of claim 9, further comprising means for comparing said downloaded preferred SID list to a preferred SID list stored in said handset, and means for selecting a single SID based upon said comparison.

12. The handset of claim 11, wherein said communication operation further comprises acquiring a control frequency corresponding to said selected SID.

13. A control system for a plurality of radio telephone subscriber units, comprising:

(a) means for broadcasting a list of System Identification Number (SID) and associated control frequencies for each service provider operating within range of said means for broadcasting, said means for broadcasting comprising a beacon operating within a predetermined geographic area on an Amplitude Modulated (AM) broadcast frequency;

(b) means in said radio telephone subscriber units for automatically tuning to a frequency on which said means for broadcasting operates when said radio telephone subscriber unit is roaming; and (c) means in each said radio telephone subscriber unit for carrying out a communication operation responsive to receipt of said SID list from said means for broadcasting.

14. A radio telephone subscriber unit comprising:

(a) means for automatically tuning to a first predetermined frequency when a roaming state is detected;

(b) means for responding to receipt of a System Identification Number (SID) corresponding to a home service provider of said radio telephone subscriber unit while said radio telephone subscriber unit is roaming;

(c) means for carrying out a communication operation responsive to receipt of said SID comprising tuning to a control frequency accompanying said SID and further comprises means for automatically tuning to a control frequency stored in said handset and corresponding to said SID, wherein said communication operation still further comprises automatically tuning to a voice channel to receive a data download of at least a list of preferred SIDs; and (d) means for comparing said downloaded preferred SID list to a preferred SID list stored in said handset, and means for selecting a single SID based upon said comparison.

15. A control system for a plurality of radio telephone subscriber units, comprising:

(a) means for broadcasting a list of System Identification Number (SID) and associated control frequencies for each service provider operating within range of said means for broadcasting;

(b) means in said radio telephone subscriber units for automatically tuning to a frequency on which said means for broadcasting operates when said radio telephone subscriber unit is roaming;

(c) each said radio telephone subscriber unit having stored therein a preferred SID list;

(d) means for broadcasting updated preferred SID lists and means in each said telephone subscriber unit for comparing such updated SID lists with said SID list stored therein and for replacing said stored SID list with said updated SID list;

(e) means in each said radio telephone subscriber unit for comparing received SIDs from said means for broadcasting pursuant to (a) and (b) with said updated preferred SID list stored in said radio telephone subscriber unit to select a received SID corresponding to an updated preferred service provider for registration by a corresponding radio telephone subscriber unit, and for carrying out a communication operation responsive to said selection.

* * * * *